(12) United States Patent
Lavretsky et al.

(10) Patent No.: US 12,165,527 B2
(45) Date of Patent: Dec. 10, 2024

(54) METHODS AND APPARATUS FOR OBSERVER-BASED LANDING CONTROL OF A VEHICLE

(71) Applicant: The Boeing Company, Arlington, VA (US)

(72) Inventors: Eugene Lavretsky, Los Angeles, CA (US); Kevin Wise, St. Louis, MO (US); Ross Gadient, Portland, OR (US); Benjamin David Levine, Tucson, AZ (US); Jasmine Beth Minteer-Levine, Tucson, AZ (US)

(73) Assignee: The Boeing Company, Arlington, VA (US)

(*) Notice: Subject to any disclaimer, the term of this patent is extended or adjusted under 35 U.S.C. 154(b) by 55 days.

(21) Appl. No.: 17/526,782

(22) Filed: Nov. 15, 2021

(65) Prior Publication Data

US 2022/0223049 A1    Jul. 14, 2022

Related U.S. Application Data

(60) Provisional application No. 63/135,251, filed on Jan. 8, 2021.

(51) Int. Cl.
*G08G 5/00* (2006.01)
*G05D 1/00* (2006.01)

(52) U.S. Cl.
CPC ............ *G08G 5/003* (2013.01); *G05D 1/042* (2013.01); *G05D 1/106* (2019.05)

(58) Field of Classification Search
CPC ......... G08G 5/003; G05D 1/106; G05D 1/042
See application file for complete search history.

(56) References Cited

U.S. PATENT DOCUMENTS 4,490,794 A * 12/1984 Griffith ................ G05D 1/0607
                                                             701/8
5,136,507 A    8/1992 Shiraishi et al.
(Continued)

FOREIGN PATENT DOCUMENTS

CN    102323756 A    1/2012
CN    104049640 A    9/2014
(Continued)

OTHER PUBLICATIONS

English translation of CN-107807663-A (Year: 2018).*
(Continued)

*Primary Examiner* — Anshul Sood
*Assistant Examiner* — Matthew Ho
(74) *Attorney, Agent, or Firm* — Hanley, Flight & Zimmerman, LLC

(57) ABSTRACT

Methods, apparatus, and articles of manufacture for observer-based landing control of a vehicle are disclosed. An example apparatus includes at least one memory, and at least one processor to execute instructions to at least in response to determining an aircraft is in a flight plan flare regime, determine an estimate state of an aircraft parameter based on an execution of a transfer function of an observer model, the execution of the transfer function based on an altitude command corresponding to the flare regime, determine a gain value based on the aircraft parameter, determine an altitude control input based on the estimate state and the gain value, determine an altitude command output based on the altitude control input and longitudinal dynamics of the aircraft, the longitudinal dynamics generated in response to the aircraft executing the altitude command output, and control an elevator of the aircraft based on the altitude command output.

20 Claims, 11 Drawing Sheets

(56) References Cited

U.S. PATENT DOCUMENTS

| | | | |
|---|---|---|---|
| 5,652,379 | A | 7/1997 | Fukatani |
| 8,086,383 | B2 | 12/2011 | Takenaka et al. |
| 8,340,841 | B2 | 12/2012 | Chiesa |
| 8,447,443 | B1 | 5/2013 | Ryan et al. |
| 8,996,195 | B2 | 3/2015 | Yucelen et al. |
| 9,656,593 | B2 | 5/2017 | Wise et al. |
| 10,216,198 | B2 | 2/2019 | Lavretsky et al. |
| 10,852,748 | B2 | 12/2020 | Lavretsky et al. |
| 2009/0171634 | A1 | 7/2009 | Bensch et al. |
| 2009/0192634 | A1 | 7/2009 | Fujinaka |
| 2009/0299494 | A1 | 12/2009 | Kahn |
| 2012/0265367 | A1 | 10/2012 | Yucelen et al. |
| 2016/0231137 | A1 | 8/2016 | Krogh et al. |
| 2018/0275682 | A1 | 9/2018 | Lavretsky et al. |
| 2018/0364707 | A1* | 12/2018 | Bosworth ............ G05D 1/0676 |
| 2020/0148345 | A1* | 5/2020 | Wittmaak, Jr. ........ B64U 30/20 |
| 2020/0317326 | A1* | 10/2020 | Sheffer ................... B64C 13/22 |

FOREIGN PATENT DOCUMENTS

| | | | | |
|---|---|---|---|---|
| CN | 105700520 | A | | 6/2016 |
| CN | 105867139 | A | | 8/2016 |
| CN | 107807663 | A | * | 3/2018 ............. G05D 1/104 |
| CN | 108628163 | A | * | 10/2018 ........... G05B 13/042 |
| WO | WO-2007116134 | A1 | * | 10/2007 ........... G05D 1/0808 |

OTHER PUBLICATIONS

English translation of WO-2007116134-A1 (Year: 2007).*

English translation of CN-108628163-A (Year: 2018).*

European Patent Office, "European Search Report," issued in connection with application No. 18162884.3, on Jul. 20, 2018, 10 pages.

Qu et al., "Squaring-Up Method in the Presence of Transmission Zeros," The International Federation of Automatic Control, Cape Town, South Africa, Aug. 24-29, 2014, 6 pages.

Eugene Lavretsky, "Adaptive Output Feedback Design Using Asymptotic Properties of LQG/LTR Controllers," IEEE Transactions on Automatic Control, vol. 57, No. 6, Jun. 2012, 5 pages.

Eugene Lavretsky, "Robust and Adaptive Control Methods for Aerial Vehicles," The Boeing Company, Handbook of Unmanned Aerial Vehicles, Springer Science+Business Media Dordrecht 2015, 36 pages.

Gibson, Travis E., et al., "Adaptive Output Feedback based on Closed-Loop Reference Models," IEEE Transactions on Automatic Control, vol. 60 (10), pp. 2728-2733, Oct. 7, 2014, 8 pages.

Wiese, Daniel P., et al., "Adaptive Output Feedback Based on Closed-Loop Reference Models for Hypersonic Vehicles," Journal of Guidance, Control, and Dynamics, vol. 38 (12), 2015, 36 pages.

Avretsky, Eugene, "Transients in output feedback adaptive systems with observer-like reference models," Int. J. Adapt. Control Signal Process., pp. 1515-1125, vol. 29, DOI: 10.1002/acs.2557, 2015, 11 pages.

Gibson, Travis E., et al., "On Adaptive Control with Closed-Loop Reference Models: Transients, Oscillations, and Peaking", IEEE Access, 10.1109/ACCESS.2013.2284005, vol. 1, pp. 703-717, Sep. 2013, 15 pages.

Non-Final Office Action issued by the United States Patent and Trademark Office in relation to U.S. Appl. No. 15/465,066, mailed Apr. 30, 2018, 13 pages.

Notice of Allowance issued by the United States Patent and Trademark Office in relation to U.S. Appl. No. 15/465,066, mailed Oct. 3, 2018, 6 pages.

European Patent Office, "Examination Report," mailed Jun. 13, 2019 in connection with European Patent Application No. 18162884.3 (6 pages).

European Patent Office, "Communication pursuant to Article 94(3) EPC", issued in connection with European Patent Application No. 18162884.3, May 7, 2020, (6 pages).

European Patent Office, "Extended European Search Report," issued in connection with application No. 21204474.7, on Mar. 31, 2022, 10 pages.

SURESH P S et al: "State Estimation for Landing Maneuver on High Performance Aircraft", Journal of the Institution of Engineers (India): Series C, Springer India, India, vol. 100, No. 1, Jan. 15, 2018 (Jan. 15, 2018), pp. 187-202.

United States Patent and Trademark Office, "Non-Final Action" issued in U.S. Appl. No. 16/271,106 on Mar. 27, 2020 (9 pages).

United States Patent and Trademark Office, "Notice of Allowance" issued in U.S. Appl. No. 16/271,106 on Jul. 29, 2020 (5 pages).

European Patent Office, "Communication Pursuant to Article 94(3) EPC," issued in connection with European Patent Application No. 18162884.3, Nov. 24, 2020 (12 pages).

European Patent Office, "Communication Pursuant to Article 94(3) EPC," issued in connection with European Patent Application No. 18162884.3, Mar. 3, 2021 (5 pages).

State Intellectual Property Office of People's Republic of China, "First Office Action," issued in connection with Chinese Patent Application No. 201810173221.7, dated Jun. 28, 2022 (12 pages, includes English translation).

Canada Patent Office, "Office Action," issued in connection with Canadian Patent Application No. 2,991,373, dated Feb. 25, 2021 (4 pages).

Derek Rowell, "2.14 Analysis and Design of Feedback Control Systems—State-Space Representation of LTI Systems," Oct. 2002 (18 pages).

* cited by examiner

METHODS AND APPARATUS FOR OBSERVER-BASED LANDING CONTROL OF A VEHICLE

RELATED APPLICATIONS

This patent claims the benefit of U.S. Provisional Patent Application No. 63/135,251, which was filed on Jan. 8, 2021. U.S. Provisional Patent Application No. 63/135,251 is hereby incorporated herein by reference in its entirety. Priority to U.S. Provisional Patent Application No. 63/135,251 is hereby claimed.

This patent includes subject matter related to U.S. Pat. Nos. 10,216,198 and 10,852,748, all of which are hereby incorporated by reference in their entireties.

FIELD OF THE DISCLOSURE

This disclosure relates generally to vehicles and, more particularly, to methods and apparatus to perform observer-based landing control of a vehicle.

BACKGROUND

In recent years, vehicle control systems, like those used in aircraft, automotive, and marine vehicles, have grown progressively more complex with the proliferation of newer and more powerful controllers. Some vehicle control systems include one or more controllers capable of implementing a greater number of complex algorithms for measuring and/or controlling different aspects of a vehicle. Control systems continue to incorporate applications of advanced control theory that previously were not feasible to implement due to software and/or hardware limitations. In addition, the applications of the control theory continue to be modified for adaptation on newer processor architectures.

Some vehicle control systems include implementations of control theory based on whether a state of the vehicle is known. In some examples, the state of the vehicle is known (measured), which enables the vehicle control system to generate a control command based on a known state of the vehicle. However, in some instances, the state of the vehicle is partially known or completely unknown. In this case, only output measurements from the vehicle sensors (such as inertial measurement units (IMUS) and rate gyros) are available to synthesize a control policy. An unknown state of the vehicle presents additional challenges to the vehicle control system such as, for example, generating a control command based on an estimation of the state of the vehicle. The estimation of the state of the vehicle requires additional processing power to perform complex algorithmic calculations based on advanced control theory techniques. Algorithms that rely on estimation of the vehicle state based on a suite of sensors are referred to as "observer-based control."

SUMMARY

An example apparatus disclosed herein includes at least one memory, and at least one processor to execute instructions to at least in response to determining an aircraft is in a flare regime of a flight plan, determine an estimate state of an aircraft parameter based on an execution of a transfer function of an observer model, the execution of the transfer function based on an altitude command corresponding to the flare regime, determine a gain value based on a measured state of the aircraft parameter, determine an altitude control input based on the estimate state and the gain value, determine an altitude command output based on the altitude control input and longitudinal dynamics of the aircraft, the longitudinal dynamics generated in response to the aircraft executing the altitude command output, and control an elevator of the aircraft based on the altitude command output.

An example tangible computer-readable storage medium disclosed herein includes instructions that, when executed, cause at least one processor to at least in response to determining an aircraft is in a flare regime of a flight plan, determine an estimate state of an aircraft parameter based on an execution of a transfer function of an observer model, the execution of the transfer function based on an altitude command corresponding to the flare regime, determine a gain value based on a measured state of the aircraft parameter, determine an altitude control input based on the estimate state and the gain value, determine an altitude command output based on the altitude control input and longitudinal dynamics of the aircraft, the longitudinal dynamics generated in response to the aircraft executing the altitude command output, and control an elevator of the aircraft based on the altitude command output.

An example method disclosed herein includes in response to determining an aircraft is in a flare regime of a flight plan, determining an estimate state of an aircraft parameter based on an execution of a transfer function of an observer model, the execution of the transfer function based on an altitude command, determining a gain value based on an aircraft parameter, determining an altitude control input based on the estimate state and the gain value, determining an altitude command output based on the altitude control input and longitudinal dynamics of the aircraft, the longitudinal dynamics generated in response to the aircraft executing the altitude command output, and controlling an elevator of the aircraft based on the altitude command output.

DETAILED DESCRIPTION

Figure 1:
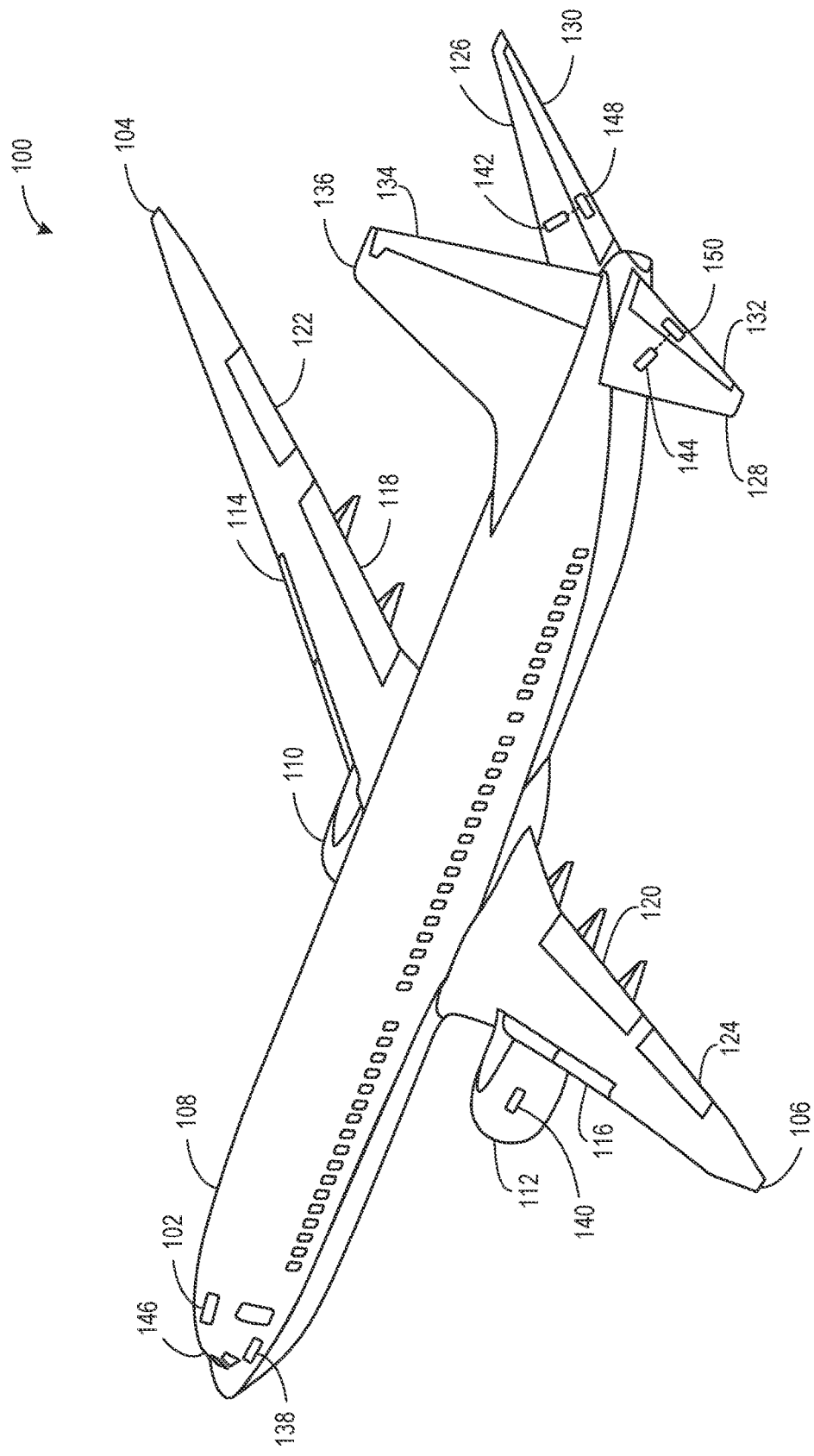
FIG. 1 is an illustration of an example aircraft that includes an example vehicle controller to implement observer-based landing control of the aircraft.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Some vehicle manufacturers have invested in vehicle control system designs to improve accuracy and robustness. The vehicle control system designs may include implementations of control theory based on whether a state of a vehicle parameter is known. In some examples, the state of the vehicle parameter is known, which enables the vehicle control system to generate a control command based on a known state of the vehicle parameter. As used herein, the term "vehicle" may refer to an air-based vehicle (e.g., aircraft, an unmanned aerial vehicle (UAV), etc.), a land-based vehicle (e.g., an automobile, a bus, a train, etc.), and/or a water or marine-based vehicle (e.g., a boat, a submarine, etc.). In some examples, the vehicle parameter may be an aircraft parameter, such as an angle of attack, a pitch rate, a first flex mode position, a second flex mode position, a first flex mode velocity, a second flex mode velocity, etc. A state of the aircraft parameter may include a value based on a measurement from a sensor, a matrix of one or more values based on one or more measurements from one or more sensors, etc. For example, a state associated with an aircraft may be measured based on one or more sensors, such as one or more acceleration sensors (e.g., an accelerometer), one or more angle of attack sensors, one or more angular rate sensors (e.g., a gyro sensor), etc., and/or a combination thereof.

In some examples, the vehicle control systems that generate commands based on known states of vehicle parameters may utilize state-space representations to develop mathematical models of a physical system (e.g., an actuator, a vehicle, etc.). The state-space representation may include a set of input, output, and state variables related by first-order ordinary differential equations. For example, a representation of a continuous time-variant system that includes m inputs, p outputs, and n state variables may be described in accordance with Equation (1) and Equation (2) below:

$$x\_dot(t) = A(t)x(t) + B(t)u(t) \qquad \text{Equation (1)}$$

$$y(t) = C(t)x(t) + D(t)u(t) \qquad \text{Equation (2)}$$

In the illustrated example of Equation (1) above, the variable x_dot(t) represents the vehicle state derivative vector, the variable A(t) represents a state matrix or a system matrix, where a dimension of A(t) is denoted by $\dim[A(t)] = n \times n$, and the variable x(t) represents a state vector, where $x(t) \in R^n$. The term $R^n$ represents a Euclidean n-dimensional space. In the illustrated example of Equation (1) above, the variable B(t) represents an input matrix where a dimension of B(t) is denoted by $\dim[B(t)] = n \times m$, and the variable u(t) represents an input vector or a control vector, where $u(t) \in R^m$. In the illustrated example of Equation (2) above, the variable y(t) represents an output vector, where $y(t) \in R^p$, the variable C(t) represents an output matrix, where a dimension of C(t) is denoted by $\dim[C(t)] = p \times n$, and the variable x(t) represents the state vector, where $x(t) \in R^n$. In the illustrated example of Equation (2) above, the variable D(t) represents a control-feedthrough matrix (i.e., a feedforward matrix) where a dimension of D(t) is denoted by $\dim[D(t)] = p \times m$, and the variable u(t) represents the input vector or the control vector, where $u(t) \in R^m$.

In some examples, controllability is a property of the vehicle control system. The controllability of a system may denote an ability to move a system around the entire configuration space of the system using only specified admissible manipulations. An example variation of controllability is state controllability. State controllability may be a condition that implies a plausibility to move a state of a parameter and/or a state of a system from any initial value to any final value within a finite time window. For example, a continuous time-invariant linear state-space model may be controllable if and only if rank $[B\ AB\ A^2B\ \ldots\ A^{n-1}B] = n$, where rank is a number of linearly independent rows in a matrix, the variable n is a number of state variables, the variable A is the state matrix, and the variable B is the input matrix.

In some examples, observability may be another property of the vehicle control system. For example, the observability of a system may be a measure for how well one or more internal states of a system (e.g., an aircraft, a flight control surface of the aircraft, etc.) can be inferred by knowing one or more external outputs of the system. In some such examples, the controllability and the observability of the system are mathematical duals. For example, the controllability of the system may denote that an input can bring any initial state to any final state, whereas the observability may denote that knowing an output of the system provides sufficient information to predict an initial state of the system.

In some examples, the state of the vehicle is unknown. An unknown state of the vehicle may present additional challenges to some such vehicle control systems such as generating the control command based on an estimation of the state of the vehicle. The estimation of the state of the vehicle may require additional hardware resources (e.g., compute (e.g., one or more processors), memory (e.g., one or more memory devices), and/or storage (e.g., one more storage discs or storage devices) hardware resources) to perform complex algorithmic calculations based on advanced control theory techniques. For example, to compensate for the unknown state (e.g., no a priori information regarding the state is known), a controller may implement state observers. In some examples, the controller may also use adaptive control to generate one or more control laws to compensate for unknown parameters.

In some examples, the vehicle control system may utilize a state observer to determine an estimate of an unknown state of the vehicle and/or an unknown state of a parameter of the vehicle. The state observer may calculate the estimate of the unknown state based on a measurement from a suite of sensors. The state observer may obtain measurements related to an input and an output of the vehicle. For example, the state observer may obtain an initial command for an input to an aircraft control system (e.g., a guidance command). In such examples, the state observer may obtain an output measurement from the vehicle sensors (e.g., the accelerometers, the rate gyros, etc.). For example, a representation of an observer model for a continuous-time-variant linear system for the vehicle that includes m inputs, p outputs, and n state variables may be described in accordance with the examples of Equation (3) and Equation (4) below:

$$\dot{\hat{x}}(t) = A(t)\hat{x}(t) + B(t)u(t) + L(y(t) - \hat{y}(t)) \quad \text{Equation (3)}$$

$$\hat{y}(t) = C(t)\hat{x}(t) + D(t)u(t) \quad \text{Equation (4)}$$

In the illustrated example of Equation (3) above, the variable $\dot{\hat{x}}(t)$ represents an estimate of the observer state derivative vector, the variable A(t) represents a state matrix or a system matrix, where a dimension of A(t) is denoted by dim[A(t)]=n×n, and the variable $\hat{x}(t)$ represents an estimate of a state vector, where $\hat{x}(t) \in R^n$. The term $R^n$ represents a Euclidean n-dimensional space. In the illustrated example of Equation (3) above, the variable B(t) represents an input matrix, where a dimension of B(t) is denoted by dim[B(t)]=n×m, and the variable u(t) represents an input vector or a control vector, where $u(t) \in R^m$. In the illustrated example of Equation (3) above, the variable L represents an observer error feedback gain, the variable y(t) represents the measurement or output vector, where $y(t) \in R^p$, and the variable $\hat{y}(t)$ represents an estimate of an output vector. The variable L may be represented and parameterized as $L_v$, where v represents a small positive constant, which in turn represents the observer model design parameter and/or the observer model tuning parameter (e.g., the parameter that may be adjusted to affect a behavior of the system).

In the illustrated example of Equation (4) above, the variable $\hat{y}(t)$ represents the estimate of the output vector, the variable C(t) represents an output matrix, where a dimension of C(t) is denoted by dim[C(t)]=p×n, and the variable $\hat{x}(t)$ represents the estimate of the state vector, where $\hat{x}(t) \in R^n$. In the illustrated example of Equation (4) above, the variable D(t) represents a feedthrough matrix (i.e., a feedforward matrix) where a dimension of D(t) is denoted by dim[D(t)]=p×m, and the variable u(t) represents the control vector or the input vector, where $u(t) \in R^m$. In some examples, the estimate of the state vector from Equation (3) is used to form the control feedback input u(t) applied to a plant (e.g., a mathematical representation of a physical system, longitudinal dynamics of an aircraft, etc.) through a gains matrix K as described in accordance with Equation (5) below:

$$u(t) = -K\hat{x}(t) \quad \text{Equation (5)}$$

Inserting Equation (5) above into Equation (3) and Equation (4) above may result in an example observer model described in accordance with Equation (6) and Equation (7) below:

$$\dot{\hat{x}}(t) = (A(t) - B(t)K)\hat{x}(t) + L(y(t) - \hat{y}(t)) \quad \text{Equation (6)}$$

$$\hat{y}(t) = (C(t) - D(t)K)\hat{x}(t) \quad \text{Equation (7)}$$

Due to the separation principle, the variables K and L may be chosen independently without disrupting the overall stability of the observer model. Advantageously, the variables K and L are effectively design variables that may be adjusted to improve performance of the observer model and that of the system.

An example vehicle controller and/or, more generally, an example vehicle control system, is/are disclosed herein for observer-based landing control of a vehicle. In some disclosed examples, the vehicle controller may be used to generate commands to control the vehicle. The example vehicle controller may generate or obtain a first command and modify the first command based on a state of a parameter of a vehicle, and/or, more generally, a state of the vehicle. For example, the vehicle controller may determine an adjustment, a modification, etc., to the first command based on a difference between a first vehicle state (e.g., an initial state) and a second vehicle state (e.g., a desired state, a predicted state, etc.). The example vehicle controller may calculate an estimate of a state for a parameter (e.g., a predicted output) in response to the vehicle executing the adjustment to the first command. The example vehicle controller may determine a second command based on the adjustment to the first command. The example vehicle controller may transmit the second command to a servomechanism (e.g., a heterostat, a mechanism to control a behavior of a system by manner of heterostasis, etc.) to execute the second command. The example vehicle controller may obtain a measurement from a sensor to determine a system output of the vehicle. For example, the vehicle controller associated with an aircraft may obtain an angular velocity measurement from a gyro sensor to estimate a state of an angle of attack parameter for the aircraft based on the aircraft or portion thereof executing a command (e.g., an adjusted command).

In some disclosed examples, the vehicle controller calculates a difference between the system output (e.g., the state of the vehicle parameter based on the measurement from the sensor) and the predicted output (e.g., the estimate of the state of the vehicle parameter). For example, the vehicle controller associated with an aircraft may determine a difference (e.g., an estimation error) between an estimate of a state for a vertical acceleration parameter for the aircraft and a measured state for the vertical acceleration parameter for the aircraft. The example vehicle controller may generate a third command based on the measurement from the sensor. The example vehicle controller may determine an adjustment to the third command based on at least one of the third command, the sensor measurement, or the estimation error. The example vehicle controller may determine a fourth command based on the adjustment to the third command. The example vehicle controller may transmit the fourth command to the servomechanism to effectuate the execution of the fourth command.

In some disclosed examples, the vehicle controller calculates an unknown state of a vehicle parameter and/or an unknown state of the vehicle based on a measurement from a sensor. For example, an aircraft may utilize one or more accelerometers to measure an acceleration of the aircraft and/or one or more angular rate sensors (e.g., gyro sensors) to measure angular velocity. The example vehicle controller may utilize measurements from one(s) of the accelerometers and/or one(s) of the gyro sensors to calculate a state of a parameter such as an angle of attack parameter, a pitch angle parameter, a pitch rate parameter, a sideslip parameter, etc. For example, an aircraft control system including the vehicle controller may estimate a value for the state of the angle of attack parameter for the aircraft based on the measurement(s) from the one(s) of the accelerometers, the one(s) of the gyro sensors, etc., as opposed to determining the value for the state of the angle of attack parameter for the aircraft based on a measurement from an angle of attack sensor. Alternatively, measurement(s) from sensor(s) of the aircraft may be used to determine any other parameter such as an airspeed parameter, an altitude parameter, a thrust parameter, etc.

In some disclosed examples, the vehicle controller identifies a phase of a flight plan, a flight route, etc., in which an aircraft is operating. For example, the flight plan may include one or more phases, regimes, segments, stages, etc., such as a parked flight stage, a taxi flight stage, a takeoff and departure flight stage, a climb flight stage, a cruise flight stage, a descent flight stage, an approach flight stage, a touchdown and roll-out flight stage, etc. In some disclosed examples, the approach flight segment or phase is referred to as a landing flare or round out. For example, the landing flare may be a maneuver that follows the approach (e.g., the final approach) stage and precedes the touchdown and roll-out stage of the landing. For example, during the flare regime, the nose of the aircraft may be raised to slow the descent rate and therefore create a softer touchdown. For example, during the flare regime, the aircraft may be controlled with a simultaneous increase in aircraft pitch attitude and a reduction in engine power (or thrust), the combination of which resulting in a decrease in both rate of descent and airspeed.

In some disclosed examples, the vehicle controller may enable observer-based control of an aircraft in response to determining that the aircraft has entered and/or otherwise transitioned into a flare regime of a flight plan. For example, the vehicle controller may effectuate automatic landing of the aircraft using one or more observer models as described herein. Advantageously, as described herein, the example vehicle controller may invoke and/or otherwise utilize the one or more observer models to enforce desired or intended levels of closed-loop stability, performance, and robustness. For example, the vehicle controller may control a flight control surface of the aircraft, and/or, more generally, the aircraft, by estimating a state of the flight control surface to facilitate control of the aircraft during the flare regime. Advantageously, the example vehicle controller may utilize the one or more observer models to estimate the state based on an attenuation of unknown flexible modes of the aircraft, reject disturbances from gusts, winds, or other weather phenomena, etc.

In some disclosed examples, the vehicle controller may include sub-modules to perform functions related to the control of the vehicle. For example, one or more of the sub-modules may be implemented with hardware, software, and/or firmware. The example sub-modules may be responsible for individual tasks such as obtaining information (e.g., network information, sensor information, etc.), determining a flight regime of a flight plan, generating a guidance command, determining a state of a parameter of the vehicle and/or the state of the vehicle, etc. The example sub-modules may be responsible for determining an estimate of a state of a parameter of the vehicle and/or an estimate of a state of the vehicle based on an execution of a command. In some examples, the sub-modules generate one or more control laws and calculate adjustments to a generated command. In some examples, the sub-modules transmit an adjusted generated command to a servomechanism to execute the adjusted generated command.

FIG. 1 is an illustration of an example aircraft 100 that includes a first example vehicle controller 102 to implement observer-based landing control of the aircraft 100. For example, the first vehicle controller 102 may facilitate automatic landing of the aircraft 100 without human intervention during a flare regime or stage of a flight plan. The aircraft 100 is a commercial aircraft. Alternatively, the first vehicle controller 102 may be included in a different type of vehicle, such as a land-based vehicle, a marine-based vehicle, or a different type of air-based vehicle such as a UAV.

In the illustrated example of FIG. 1, the aircraft 100 includes wings 104, 106 coupled to a fuselage 108. Engines 110, 112 are coupled to the wings 104, 106. Slats 114, 116, flaps 118, 120, and ailerons 122, 124 are operatively coupled to the wings 104, 106. Additional aircraft control surfaces of the aircraft 100 include horizontal stabilizers 126, 128, elevators 130, 132, and a vertical stabilizer 134. In this example, the elevators 130, 132 are operatively coupled to respective ones of the horizontal stabilizers 126, 128. In this example, the vertical stabilizer 134 is operatively coupled to a tail surface 136, which is coupled to the fuselage 108.

In the illustrated example of FIG. 1, the aircraft 100 includes a plurality of example sensors 138, 140, 142, 144. The placement and quantity of the sensors 138, 140, 142, 144 are merely exemplary and not limited thereto. For example, the aircraft 100 may include fewer or more sensors 138, 140, 142, 144 than depicted and/or one(s) of the sensors 138, 140, 142, 144 may be located elsewhere on the aircraft 100. The sensors 138, 140, 142, 144 include a first example sensor 138, a second example sensor 140, a third example sensor 142, and a fourth example sensor 144. The first sensor 138 is located proximate to and/or otherwise towards a nose of the aircraft 100, such as by a cockpit 146 of the aircraft 100. For example, the first sensor 138 may be a wireless sensor or a wired sensor. In some examples, the first sensor 138 may collect a pressure measurement (e.g., an air pressure measurement). For example, the first sensor 138 may be implemented by a pressure sensor such as a piezoelectric pressure sensor (e.g., a passive piezoelectric pressure sensor, a diaphragm pressure sensor, a pitot tube, etc. In some examples, the first sensor 138 is an acceleration sensor (e.g., an accelerometer), an angle of attack sensor, an angular rate sensor (e.g., a gyro sensor), an altitude sensor (e.g., an altimeter), a speed sensor, a temperature sensor, etc., or any other type of sensor that may monitor a parameter of the aircraft 100. In some examples, measurement(s) from the first sensor 138 may be used to determine a parameter of the aircraft 100, such as an altitude rate, a pitch rate, a pitch angle, etc., of the aircraft 100.

The second sensor 140 is included in the second engine 112. In some examples, the second sensor 140 may monitor and/or otherwise collect a measurement associated with the second engine 112. For example, the second sensor 140 may be implemented by an acceleration sensor, an angular rate sensor, a pressure sensor, a speed sensor (e.g., an encoder, a proximity inductive sensor, etc., to measure a rotational speed of a turbine of the second engine 112), a temperature sensor (e.g., a sensor to measure a temperature of an inlet, an outlet, a compressor, etc., of the second engine 112), etc. In some examples, measurement(s) from the second sensor 140 may be used to determine a parameter of the aircraft 100, such as an altitude rate, a pitch rate, a pitch angle, etc., of the aircraft 100.

The third sensor 142 is included in the first horizontal stabilizer 126 to monitor and/or otherwise measure a parameter associated with the first elevator 130. Alternatively, the third sensor 142 may be included in the first elevator 130. The fourth sensor 144 is included in the second horizontal stabilizer 128 to monitor and/or otherwise measure a parameter associated with second elevator 132. Alternatively, the fourth sensor 144 may be included in the second elevator 132. The third sensor 142 and/or the fourth sensor 144 may be implemented with one or more position sensors, one or more skew position sensors, one or more electric power usage sensors (e.g., a voltage sensor, a current sensor, etc.), one or more hydraulic parameter sensors (e.g., a hydraulic flow rate sensor, a hydraulic pressure sensor, etc.), one or more motor speed sensors, etc. For example, the third sensor 142 may be implemented with one or more sensors to monitor and/or otherwise measure parameter(s) associated with a first actuator 148. In some examples, the fourth sensor 144 may be implemented with one or more sensors to monitor and/or otherwise measure parameter(s) associated with a second actuator 150.

In some examples, the first actuator 148 and/or the second actuator 150 is/are implemented with an electromechanical actuator, an electrohydraulic actuator, an electric backup hydraulic actuator, a hydraulic actuator, etc. For example, the first actuator 148 may be operatively coupled to the first elevator 130 to move the first elevator 130 from a stowed position to a deployed position, or any intermediate position between the stowed position and the deployed position. In some examples, the second actuator 150 is operatively coupled to the second elevator 132 to move the second elevator 132 from a stowed position to a deployed position, or any intermediate position between the stowed position and the deployed position.

In some examples, the actuators 148, 150 are motors (e.g., an electric motor, a hydraulic motor, etc.). In some examples, the actuators 148, 150 are operatively coupled to respective motors included in the horizontal stabilizers 126, 128 or the elevators 130, 132. For example, the actuators 148, 150 may be implemented with one or more linear actuators (e.g., hydraulic or electric linear actuators), rotary actuators (e.g., hydraulic or electric rotary actuators), etc. In some examples, the first actuator 148, when invoked and/or otherwise instructed, may control a motor associated with the first elevator 130 to cause the first elevator 130 to change or adjust positions. In some examples, the second actuator 150, when invoked and/or otherwise instructed, may control a motor associated with the second elevator 132 to cause the second elevator 132 to change or adjust positions.

In some examples, the third sensor 142 may be implemented with a position sensor, a position skew sensor, etc., to measure a position of the first actuator 148 to determine a position of the first elevator 130. In some examples, the third sensor 142 may be implemented with a voltage or current sensor to determine a power consumption associated with the first actuator 148. In some examples, the third sensor 142 may be implemented with a hydraulic parameter sensor to measure a hydraulic parameter (e.g., a flow rate, a hydraulic fluid temperature, etc.) of the first actuator 148 in an example where the first actuator 148 is hydraulically powered or actuated. In some examples, the third sensor 142 may be implemented with a speed sensor (e.g., an actuator speed sensor, a motor speed sensor, etc.) to determine a speed at which the first actuator 148 is moving, a speed at which a motor operatively coupled to the first actuator 148 is rotating and/or otherwise moving, etc.

In some examples, the fourth sensor 144 may be implemented with a position sensor, a position skew sensor, etc., to measure a position of the second actuator 150 to determine a position of the second elevator 132. In some examples, the fourth sensor 144 may be implemented with a voltage or current sensor to determine a power consumption associated with the second actuator 150. In some examples, the fourth sensor 144 may be implemented with a hydraulic parameter sensor to measure a hydraulic parameter (e.g., a flow rate, a hydraulic fluid temperature, etc.) of the second actuator 150 in an example where the second actuator 150 is hydraulically powered or actuated. In some examples, the fourth sensor 144 may be implemented with a speed sensor (e.g., an actuator speed sensor, a motor speed sensor, etc.) to determine a speed at which the second actuator 150 is moving, a speed at which a motor operatively coupled to the second actuator 150 is rotating and/or otherwise moving, etc. In some examples, measurement(s) from the third sensor 142 and/or the fourth sensor 144 may be used to determine a parameter of the aircraft 100, such as an altitude rate, a pitch rate, a pitch angle, etc., of the aircraft 100. For example, a position of the first actuator 148, the first elevator 130, etc., may be used to determine the altitude rate, the pitch rate, the pitch angle, etc., of the aircraft 100.

In the illustrated example of FIG. 1, the aircraft 100 includes the first vehicle controller 102 to perform observer-based control of one or more control surfaces of the aircraft 100, and/or, more generally, the aircraft 100. In this example, the first vehicle controller 102 is included in and/or otherwise located proximate a cockpit 146 of the aircraft 100. Additionally or alternatively, the first vehicle controller 102 may have one or more components located elsewhere on the aircraft 100. For example, the first vehicle controller 102 may be implemented using a distributed hardware, software, and/or firmware architecture. In such examples, a first hardware component (e.g., a processor, a memory device, an input/output (I/O) device, a network interface, etc.) may be included in the cockpit 146 while one or more second hardware components (e.g., a processor, a memory device, an I/O device, a network interface, etc.) may be included elsewhere on the aircraft 100, such as in one of the wings 104, 106, the fuselage 108, one of the horizontal stabilizers 126, 128, etc. In this example, there is only one instance of the first vehicle controller 102. Alternatively, there may be more than one instance of the first vehicle controller 102 included in the aircraft 100.

In the illustrated example of FIG. 1, the first vehicle controller 102 performs observer-based control of the aircraft 100. For example, the first vehicle controller 102 may effectuated and/or otherwise cause control of the aircraft 100 based on one or more observer-models determining estimate(s) of state(s) of parameter(s) of the aircraft 100 based on sensor measurement(s) from one(s) of the sensors 138, 140, 142, 144. In some examples, the first vehicle controller 102 may determine a first state of one or more control surfaces of the aircraft 100, such as one(s) of the elevators 130, 132 during a flare regime of the flight plan executed by the aircraft 100. For example, the first vehicle controller 102 may determine a first state of one(s) of the elevators 130, 132, and/or, more generally, the aircraft 100 based on sensor measurement(s). In some examples, the first state may be determination(s) of an altitude rate, a pitch rate, a pitch angle, etc., and/or a combination thereof, of the aircraft 100 based on measurement(s) from the one(s) of the sensors 138, 140, 142, 144.

In some examples, the first vehicle controller 102 may determine a second state (e.g., an estimate of a state) of the one or more control surfaces of the aircraft 100 based on the aircraft 100 executing a command (e.g., a landing command, a flare operation command, etc.). For example, the first vehicle controller 102 may determine the second state (e.g., the estimate of the state) of the one(s) of the elevators 130, 132 based on the one(s) of the elevators 130, 132 executing the command. In some examples, the second state may be an estimate of an altitude rate, a pitch rate, a pitch angle, etc., and/or a combination thereof, of the aircraft 100 by utilizing one or more observer-based models. The first vehicle controller 102 may also determine a third state (e.g., an updated estimate of the second state) of the one or more control surfaces of the aircraft 100 based on the difference between the first state and the second state. For example, the first vehicle controller 102 may also determine a third state of the elevators 130, 132, and/or, more generally, the aircraft 100, based on the difference between the first state and the second state of the elevators 130, 132. In some examples, the first vehicle controller 102 may determine and/or generate a control input (e.g., a control input based on a baseline control input and/or an adaptive control input), which may implement a command to control the one or more control surfaces of the aircraft 100, such as the elevators 130, 132. For example, the first vehicle controller 102 may determine and/or generate the command to control the elevators 130, 132 (e.g., a control a position of the elevators 130, 132) based on the difference between the first state and the second state. In response to the generation of the command, the aircraft 100 may execute the command. For example, the elevators 130, 132 may move from a first position to a second position in response to the elevators 130, 132 executing the command.

Figure 2:
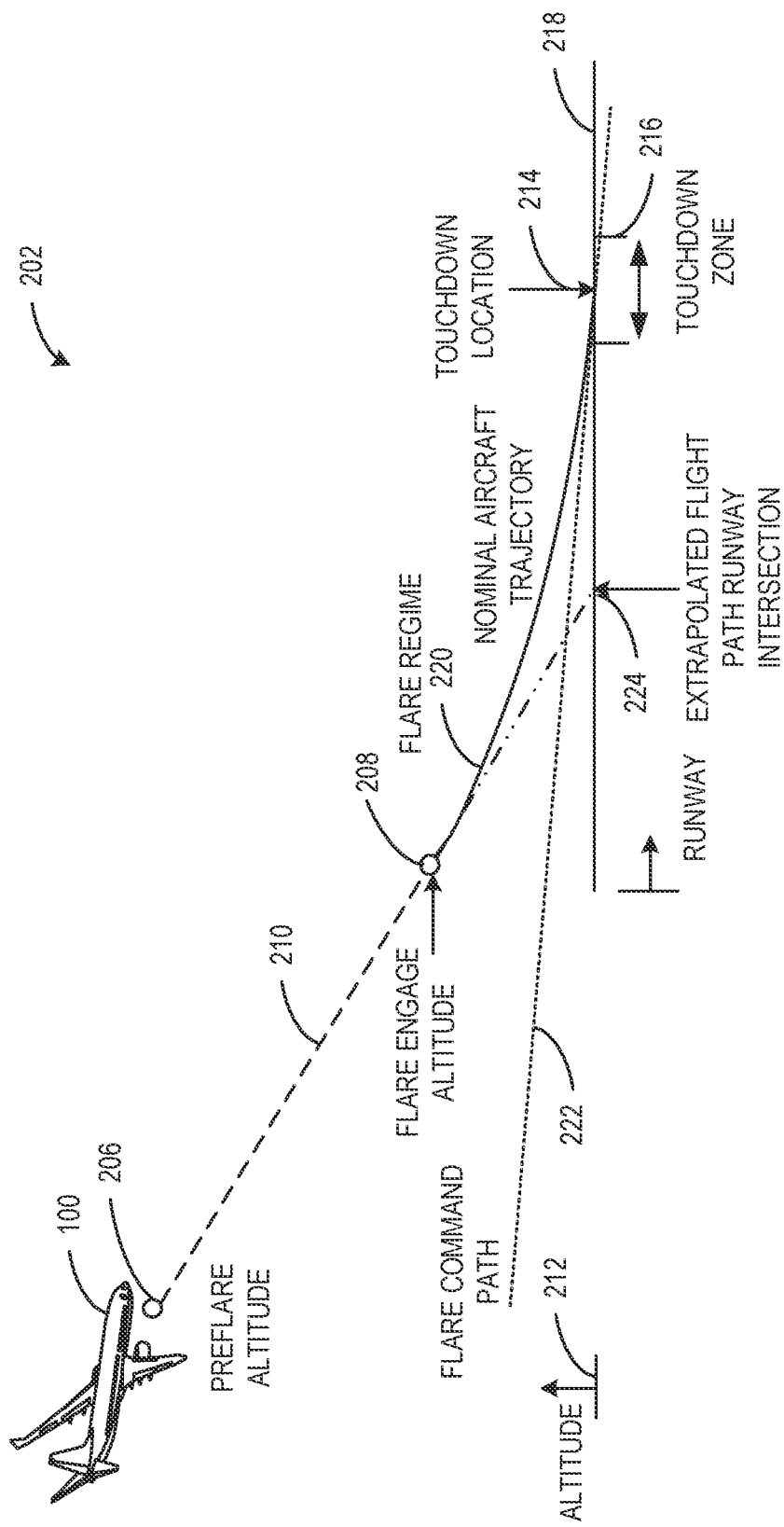
FIG. 2 is an illustration of the example aircraft of FIG. 1 operating in an example flare regime of an example flight plan.

FIG. 2 is an illustration of the example aircraft 100 of FIG. 1 operating in an example flare regime 220 of an example flight plan 202. In this example, the flight plan 202 includes one or more waypoints 206, 208 at which the aircraft 100 flies and/or otherwise moves along a flight path to execute the flight plan 202. In this example, the aircraft 100 is at a first example waypoint 206 at which the aircraft 100 is at a preflare regime, stage, segment, etc., of the flight plan 202. For example, the aircraft 100 may fly along an example preflare aircraft flight path 210, which is implemented by a flight path between the first waypoint 206 and a second example waypoint 208.

In the illustrated example of FIG. 2, the aircraft 100 engages and/or otherwise begins a flare operation at an altitude of the second waypoint 208. For example, the first vehicle controller 102 of the aircraft 100 may determine that the aircraft 100 is at an altitude 212, a portion of the flight plan 202, etc., at which the aircraft 100 is to execute a landing flare or round out flight operation. In some examples, the first vehicle controller 102 may control the aircraft 100 to execute the flare operation at the second waypoint 208 by causing a nose of the aircraft 100 to rise to slow the descent rate and therefore create a softer touchdown at a touchdown location 214 within a touchdown zone 216 on a runway 218 or other ground surface.

In the illustrated example of FIG. 2, the portion of the flight plan 202 between the second waypoint 208 and the touchdown location 214 implements an example flare regime (e.g., a flare flight stage, a flare flight segment, etc.) 220 of the flight plan 202. For example, the flare regime 220 may be based on a combination of the preflare aircraft flight path 210 and an example flare command path 222. In such examples, the flare regime 220 implements a nominal aircraft trajectory to adjust an extrapolated flight path runway intersection 224 to the touchdown location 214 of the touchdown zone 216. For example, during the flare regime 220, the first vehicle controller 102 may control the aircraft 100 using one or more observer-based models to perform automatic landing control of the aircraft 100 with a simultaneous increase in aircraft pitch attitude and a reduction in engine power (or thrust) of the engines 110, 112 of FIG. 1, the combination of which may result in a decrease in both rate of descent and airspeed of the aircraft 100.

Figure 3:
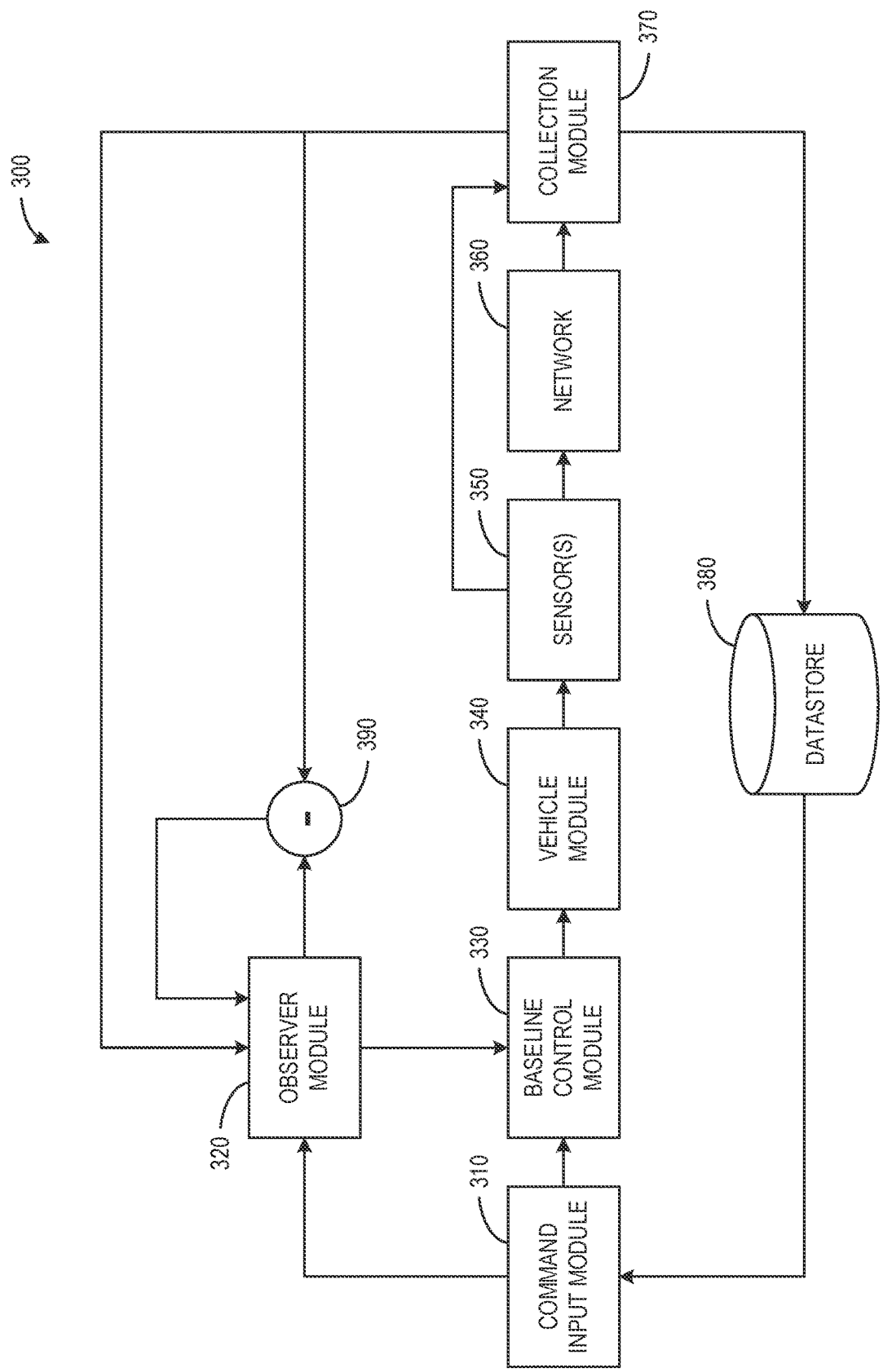
FIG. 3 is a block diagram of a first example implementation of the example vehicle controller of FIG. 1.

FIG. 3 is a block diagram of an example implementation of a second example vehicle controller 300. In some examples, the second vehicle controller 300 implements the first vehicle controller 102 of FIG. 1. The second vehicle controller 300 controls a vehicle, such as the aircraft 100 of FIGS. 1 and/or 2, with a generated command based on a measurement from a sensor, such as one(s) of the sensors 138, 140, 142, 144 of FIG. 1. In this example, the second vehicle controller 300 includes an example command input module 310, an example observer module 320, an example baseline control module 330, an example vehicle module 340, example sensor(s) 350, an example network 360, an example collection module 370, an example datastore 380, and an example error module 390.

In the illustrated example of FIG. 3, the second vehicle controller 300 includes the command input module 310 to obtain or generate a command to control a vehicle. In some examples, the command input module 310 generates the command based on user input. For example, a pilot of the aircraft 100 may perform an action (e.g., maneuvering a joystick, pressing a button, annunciating a voice command, etc.) that the command input module 310 translates into the command to the baseline control module 330 and to the observer module 320. In some examples, the command input module 310 generates the command based on a measurement from the sensor(s) 350. For example, the command input module 310 may represent a guidance module (e.g., a guidance module of an unmanned aircraft (e.g., a UAV)) that generates the command for the baseline control module 330 to calculate the corresponding output and to move a control surface (e.g., one(s) of the flaps 118, 120, one(s) of the elevators 130, 132, etc., of FIG. 1) of the aircraft 100 based on a measurement from the sensor(s) 350.

In some examples, the command input module 310 generates the command based on information obtained from the datastore 380. For example, the command input module 310 may generate the command based on a look-up table that includes commands based on the measurement from the sensor(s) 350. For example, the command input module 310 may determine the measurement from the sensor(s) 350 and query the look-up table in the datastore 380 for the command corresponding to the measurement from the sensor(s) 350.

In some examples, the command input module 310 determines a difference between a command (e.g., a guidance command) and a measurement from the sensor(s) 350. For example, the command input module 310 may determine a first value (e.g., an initial command, an initial state of a parameter, an initial state of the vehicle, etc.). For example, the first value may be a guidance command r. The command input module 310 may determine a second value (e.g., a value obtained from the datastore 380). For example, the second value may be a measurement y or $y_{meas}$ from the datastore 380. The command input module 310 may determine a difference between the first value and the second value. For example, the command input module 310 may determine a difference between the command and the measurement to determine an error value of −e (e.g., r−y=−e). In some examples, the command input module 310 transmits the error value to the baseline control module 330.

In the illustrated example of FIG. 3, the second vehicle controller 300 includes the observer module 320 to determine a state of a parameter of the vehicle, and/or, more generally, a state of the vehicle. In some examples, the observer module 320 utilizes one or more observer models. The one or more observer models may be mathematical representation(s) of the vehicle that provides an estimate of one or more internal states of the vehicle. The one or more observer models may determine the estimate of the one or more internal states of the vehicle based on a measurement of one or more inputs (e.g., commands) and/or outputs (e.g., sensors) of the vehicle.

In some examples, the observer module 320 determines a state of a vehicle parameter based on a measurement from the sensor(s) 350. For example, the observer module 320 may determine a state of an angle of attack parameter of the aircraft 100 based on a measurement from an angle of attack sensor (e.g., from one(s) of the sensors 138, 140, 142, 144 of FIG. 1). In some examples, the observer module 320 determines an estimate of the state of the vehicle parameter. For example, the observer module 320 may determine an estimate of the state of the angle of attack parameter of the aircraft 100 based on a measurement from a gyro sensor, a value (e.g., a sensor measurement, a value of a vehicle parameter state, etc.) from the datastore 380, etc. The observer module 320 may obtain the measurement from the sensor(s) 350 from the collection module 370.

In some examples, the observer module 320 determines an estimate for a state of a parameter of the vehicle based on the vehicle executing a command. For example, the observer module 320 may determine the state of a vehicle parameter before executing the command and calculate an estimate of the state of the vehicle parameter in response to executing the command. For example, the observer module 320 may determine a first value (e.g., an initial value) of a state of an angle of attack parameter of the aircraft 100. The observer module 320 may calculate a second value (e.g., an estimate value) of the state of the angle of attack parameter of the aircraft 100 based on the aircraft 100 executing the command. The observer module 320 may calculate a first difference between the first value and the second value.

In some examples, the observer module 320 determines an estimate for a state of a parameter of the vehicle based on the vehicle executing a command during the flare regime 220 of FIG. 2. For example, the observer module 320 may determine the state of a parameter, such as an altitude, an altitude rate, a pitch rate, a pitch angle, etc., of the aircraft 100 at the second waypoint 208 before a control surface, such as the first elevator 130 of FIG. 1, executes a command to effectuate a flare operation of the aircraft 100. For example, the command may correspond to a command generated by the first vehicle controller 102 and/or the second vehicle controller 300 to move the first elevator 130 from a first position to a second position. In some examples, during the flare regime 220, the observer module 320 may calculate an estimate of the state of the parameter in response to the aircraft 100 executing the command. For example, the observer module 320 may determine a first value (e.g., an initial value) of the altitude, the altitude rate, the pitch rate, the pitch angle, etc. The observer module 320 may calculate a second value (e.g., an estimate value) of the state of the altitude, the altitude rate, the pitch rate, the pitch angle, etc., based on the first elevator 130, and/or, more generally, the aircraft 100, executing the command. The observer module 320 may calculate a first difference between the first value and the second value.

In some examples, the observer module 320 compares the first difference to an error estimation value calculated external to the observer module 320 to improve the observer module 320 state estimating functions. For example, the error estimation value may be calculated by the error module 390. In some examples, the error estimation value may be calculated based on a second difference between (1) the value of the state of the parameter based on the measurement from the sensor(s) 350 and (2) the estimate value of the parameter calculated by the observer module 320. For example, the parameter may be a pitch rate of the aircraft 100, the value of the state of the parameter may be 5 degrees, and the estimate value of the parameter may be 3 degrees.

In some examples, the observer module 320 transmits the estimate value of the state of the parameter to the error module 390. In some examples, the observer module 320 determines whether the first difference and/or the second difference satisfies a threshold. For example, the observer module 320 may determine that the first difference (e.g., 2 degrees) does not satisfy a threshold (e.g., 1 degree, 0.5 degrees, etc.). In some examples, the observer module 320 may determine that the first difference does not satisfy the threshold because the first difference is less than the threshold. In some examples, the observer module 320 may determine that the first difference satisfies the threshold because the first difference is greater than the threshold. In some examples, the observer module 320 may determine that the second difference (e.g., 3 degrees) satisfies the threshold because the second difference is greater than the threshold. In some examples, the observer module 320 may determine that the second difference does not satisfy the threshold because the second difference is less than the threshold.

In some examples, the observer module 320 determines an estimate of a state of a parameter of a vehicle, and/or, more generally, a state of the vehicle based on an obtained command. For example, the observer module 320 may determine an estimate of a state of a sideslip parameter of the aircraft 100 based on a command obtained from the command input module 310. The observer module 320 may determine the estimate of the state based on the command obtained from the command input module 310, the measurement from the sensor(s) 350, the error estimation obtained by the observer module 320, etc. For example, the observer module 320 may determine a first value (e.g., an initial value) for a state of a parameter of the aircraft 100. The observer module 320 may additionally determine a second value (e.g., an estimate value) for the state of the parameter based on the aircraft 100 executing the command obtained from the command input module 310. The observer module 320 may also determine a third value (e.g., an updated estimate of the state of the vehicle parameter) based on the difference between the first value and the second value. In some examples, the observer module 320 determines the third value in response to at least one of the first difference or the second difference as described above satisfying one or more thresholds. In some examples, the observer module 320 transmits the third value (e.g., the updated estimate of the state of the parameter) to the baseline control module 330.

In some examples, the observer module 320 performs a squaring-up modification to an input matrix and/or an output matrix of the one or more observer models utilized and/or otherwise implemented by the observer module 320. In some examples, the observer module 320 adds a pseudo-output matrix to the output matrix of the one or more observer models. In some examples, the observer module 320 adds a pseudo-input matrix to the input matrix of the one or more observer models. For example, the observer module 320 may add the pseudo-input matrix, which may include fictitious inputs (e.g., inputs that do not represent physical inputs to the vehicle), to the input matrix of the one or more observer models to make a number of inputs (e.g., controls) in the input matrix equal a number of outputs (e.g., measurements) in the output matrix. In some examples, the observer module 320 makes the one or more observer models used by the observer module 320 minimum phase (e.g., the vehicle transmission zeros are located in $C^-$) by performing the squaring-up modification(s). During the squaring-up modification(s), the observer module 320 may place one or more zeros (e.g., transmission zeros) in a desired location utilizing a linear quadratic regulator (LQR) and/or a pole-placement algorithm or technique. The observer module 320 may perform the squaring-up modification(s) to satisfy one or more sufficient conditions. A first sufficient condition may be a relationship of p=m, where p represents a number of outputs and m represents a number of inputs. For example, the first sufficient condition may represent square dynamics of the one or more observer models used by the observer module 320. A second sufficient condition may be a relationship of det (CB)$\neq$ 0, where a determinant of an output matrix C and an input matrix B does not equal zero. For example, the second sufficient condition may represent a relative degree of one. A third sufficient condition may be a relationship of det $$\begin{pmatrix} sI-A & B \\ C & 0 \end{pmatrix} = 0$$

where $s \in C^-$. For example, the third sufficient condition may include a determinant of a matrix including the input matrix B, the output matrix C, and a transfer function sI–A, where the determinant of the matrix equals zero, and where all zeros (e.g., transmission zeros) are in the open left half of the complex plane of the output matrix C (excluding the jw-axis). For example, the third sufficient condition may represent and/or otherwise indicate that the observer module 320 uses the one or more observer models that include one or more transmission zeros that are stable. In some examples, the third sufficient condition may represent that the observer module 320 uses the one or more observer models representing a system that is minimum phase.

In some examples, the observer module 320 performs the squaring-up modification(s) by converting a tall system to a square system. For example, a tall, controllable, observable, and minimum-phase system with full rank $C_{meas}$*B may be squared-up to satisfy the first, second, and third example sufficient conditions as described above, where the variable $C_{meas}$ represents the output matrix $$\begin{pmatrix} I_{m \times m} & 0 \\ 0 & C_{p\,meas} \end{pmatrix}.$$

An example tall system is described in Equation (8) below:

$$\begin{pmatrix} A & B \\ C_{meas} & 0_{p \times m} \end{pmatrix} \in R^{(n+p) \times (n+m)} \quad \text{Equation (8)}$$

In the illustrated example of Equation (8) above, variables A and B represent m-Inputs, variables $C_{meas}$ and $0_{p \times m}$ represent p-Outputs, and the variable n represents the number of states. The observer module 320 may convert the example tall system described above in Equation (8) into an example square system as described in Equation (9) below:

$$\begin{pmatrix} A & (B, B_2) \\ C_{meas} & 0_{p \times p} \end{pmatrix} \in R^{(n+p) \times (n+p)} \quad \text{Equation (9)}$$

In the illustrated example of Equation (9) above, the variables A and (B, B$_2$) represent p-Inputs, the variables $C_{meas}$ and $0_{p \times p}$ represent p-Outputs, and the variable n represents the number of states. As described in Equation (9) above, the observer module 320 may add one or more fictitious inputs to the input matrix of B to yield a second input matrix (B, B$_2$), where B$_2$ is a pseudo-input matrix. The observer module 320 may replace the input matrix of B with the second input matrix (B, B$_2$) in the first, second, and third example sufficient conditions as described above. The observer module 320 may satisfy the first, second, and third example sufficient conditions due to the following revised relationships $$\overline{B} = (B, B_2) \to \det(C_{meas}\overline{B}) \neq 0 \wedge \left(\det\begin{pmatrix} sI-A & \overline{B} \\ C_{meas} & 0 \end{pmatrix} = 0, \to s \in C^-\right),$$

where the revised relationships are determined by at least Equation (9) above. For example, the revised relationships may represent that the pseudo-input matrix B$_2$ generated during the squaring-up modification(s) satisfy the first, second, and third example sufficient conditions as described above. As a result, the observer module 320 may utilize the input matrix $\overline{B}$ in the one or more observer models to perform observer-based landing control of the aircraft 100 during a stage of a flight plan, such as the flare regime 220 of the flight plan 202 of FIG. 2.

In some examples, the observer module 320 determines one or more symmetric, positive, definite, and parameter-dependent weight matrices for the one or more observer models. For example, the observer module 320 may assign $Q_0 \in R^{n \times n}$ and $R_0 \in R^{m \times m}$ to be symmetric and positive definite, where $R^{n \times n}$ denotes the space of all n×n matrices, and where $R^{m \times m}$ denotes the space of all m×m matrices. The observer module 320 may determine one or more constants within $R^{n \times n}$ and/or $R^{m \times m}$. For example, the observer module 320 may determine a value for constants v and/or $\eta$, where v>0 and $\eta$>0. The observer module 320 may determine two symmetric, positive, definite, and parameter-dependent weight matrices as described in Equation (10) and Equation (11) below:

$$Q_v = Q_0 + \left(\frac{v+1}{v}\right)\overline{BB}^T \qquad \text{Equation (10)}$$

$$R_v = \frac{v}{v+1}R_0 \qquad \text{Equation (11)}$$

The observer module 320 may use at least one of the constants v and/or η, Equation (10) above, or Equation (11) above to evaluate a parameter-dependent Algebraic Riccati Equation (ARE) as described in Equation (12) below:

$$P_v(A+\eta I_{n\times n})^T+(A+\eta I_{n\times n})P_v-P_vC_{meas}^TR_v^{-1}C_{meas}P_v+Q_v=0 \qquad \text{Equation (12)}$$

In the illustrated example of Equation (12) above, the variable $P_v$ represents the unique, symmetric, positive, and definite solution for any positive value of the constants v and η. In the illustrated example of Equation (12) above, the variable A represents the observer matrix included in the one or more observer models utilized by the observer module 320, and the variable $I_{n\times n}$ represents an identity matrix of size n×n. In some examples, the observer module 320 evaluates the asymptotic behavior of $P_v$ as v→0 while holding η fixed. For example, the observer module 320 may use the asymptotic expansion as described below in Equation (13) to determine one or more asymptotic relations as described in Equation (14), Equation (15), and Equation (16) as described below where the variable O represents Bachmann-Landau asymptotic order notation:

$$P_v = P_0 + P_1v + O(v^2) \qquad \text{Equation (13)}$$

$$P_v = P_0 + O(v) \qquad \text{Equation (14)}$$

$$P_v^{-1} = P_0^{-1} + O(v) \qquad \text{Equation (15)}$$

$$P_v^{-1}\overline{B} = C_{meas}^TR_0^{-\frac{1}{2}}W + O(v) \qquad \text{Equation (16)}$$

In some examples, the observer module 320 evaluates the asymptotic expansion described above in Equation (13) to determine the asymptotic relations as described above in Equation (14), Equation (15), and Equation (16) as v→0, with a constant, symmetric, positive, and definite matrix $P_0$. In some examples, the observer module 320 evaluates Equation (16) above by applying a relationship of $W=(UV)^T$, where the two unitary matrices, U and V, are defined by the singular value decomposition as described in Equation (17) below:

$$\overline{B}^TC_{meas}^TR_0^{-1/2}=U\Sigma V \qquad \text{Equation (17)}$$

In the illustrated example of Equation (17) above, the notation represents the diagonal matrix of the corresponding singular values. In some examples, Equation (16) above and Equation (17) above guarantee strict positive definiteness of $P_v$ and $P_v^{-1}$ uniformly in v. The observer module 320 may utilize one or more of the above-described equations to determine the observer gain $L_v$ as described in Equation (18) below:

$$L_v=P_vC_{meas}^TR_v^{-1} \qquad \text{Equation (18)}$$

In the illustrated example of Equation (18) above, the variable $P_v$ represents the unique solution described above in Equation (12), where $P_v=P_v^T>0$. The observer module 320 may utilize the relationship described above in Equation (18) to determine the closed-loop observer dynamics of the observer model of a system (e.g., a vehicle, the aircraft 100, etc.) as described in Equation (19) and Equation (20) below:

$$\hat{\dot{x}}=A\hat{x}+Bu_{bl}+B_{cmd}y_{cmd}+L_v(y_{meas}-\hat{y}_{meas}) \qquad \text{Equation (19)}$$

$$\hat{y}_{meas}=C_{meas}\hat{x} \qquad \text{Equation (20)}$$

In the illustrated example of Equation (19) above, the variable $\hat{\dot{x}}$ represents an estimate of an observer state derivative vector, the variable A represents a state matrix, and the variable $\hat{x}$ represents an estimate of a state vector. Further, in the illustrated example of Equation (19) above, the variable B represents an input matrix, the variable $B_{cmd}$ represents an input command matrix, and the variable $y_{cmd}$ represents an output command vector. In the illustrated example of Equation (19) above, the variable $L_v$ represents the observer gain, the variable $y_{meas}$ represents a measured output vector (e.g., a measurement from a sensor), and the variable $\hat{y}_{meas}$ represents an estimate of a measured output vector. Additionally, in the illustrated example of Equation (19) above, the variable $u_{bl}$ represents a baseline control input or a baseline control command (e.g., a value generated by the baseline control module 330), where $u_{bl}$ may be described in accordance with Equation (21) below:

$$u_{bl}=-K_{lqr}\hat{x} \qquad \text{Equation (21)}$$

In the illustrated example of Equation (21) above, the variable $K_{lqr}$ represents a constant Linear Quadratic Regulator (LQR) baseline control gain, where $K_{lqr} \in R^{n\times m}$. In Equation (20) above, the variable $C_{meas}$ represents a measured output matrix. Further, in Equation (20) above, the measured output vector $\hat{y}_{meas}$ tracks the bounded command $y_{cmd}$ described above in Equation (19) with uniformly bounded errors.

The observer module 320 may determine the variable $K_{lqr}$ such that an observer state matrix $A_{obs}$ described below in Equation (22) becomes Hurwitz (e.g., every eigenvalue of $A_{obs}$ has a strictly negative real part) and has one or more desired modal characteristics:

$$A_{obs}=A-BK_{lqr}-L_vC_{meas} \qquad \text{Equation (22)}$$

The observer module 320 may apply Equation (22) above to Equation (20) above to yield Equation (23) as described below:

$$\hat{\dot{x}}=A_{obs}\hat{x}+B_{cmd}y_{cmd}+L_vy_{meas} \qquad \text{Equation (23)}$$

In some examples, the observer module 320 determines and/or otherwise evaluates the relationship as described above in Equation (23) to recover LQR full state baseline feedback stability margins at the input to the vehicle plant. In some instances, the observer module 320 determines a value of the constant v to be sufficiently small to recover the LQR stability margins at the input to the one or more observer models and/or the vehicle plant.

In the illustrated example of FIG. 3, the second vehicle controller 300 includes the baseline control module 330 to generate a control input to control the vehicle, such as the aircraft 100 of FIGS. 1 and/or 2. For example, the baseline control module 330 may generate a value for a control input variable u to control a control surface, such as one of the flaps 118, 120, one of the ailerons 122, 124, one of the elevators 130, 132, etc., of the aircraft 100. In some examples, the baseline control module 330 generates the control input based on a guidance command obtained from the command input module 310. In some examples, the baseline control module 330 generates the control input based on an estimate of a state of the vehicle obtained from the observer module 320 and/or an estimate of a state of a parameter of the vehicle obtained from the observer module 320.

In some examples, the baseline control module 330 includes integral error control mechanisms such as, for example, an integral controller transfer function representative of a servomechanism. The baseline control module 330 may obtain a guidance command r and/or an error value −e from the command input module 310. The baseline control module 330 may utilize an integral controller transfer function $$\frac{K_i}{s},$$

or a logic circuit to implement the integral controller transfer function $$\frac{K_i}{s},$$

to generate a baseline command utilized to generate the control input u. For example, the baseline control module 330 may apply the integral controller transfer function to the obtained guidance command (or pass through the obtained guidance command through a logic circuit that implements the integral controller transfer function) to generate and/or otherwise output the baseline command. In some examples, the baseline control module 330 determines a difference between the baseline state of a parameter (e.g., the baseline command) and an estimate of a state of the parameter obtained from the observer module 320 (e.g., a state feedback stability value $K_x$, where x represents the state and/or the estimate of the state) to determine the control input u. The baseline control module 330 may determine the control input u as described in Equation (24) below:

$$u = -K_{lqr}\hat{x} \qquad \text{Equation (24)}$$

In the illustrated example of Equation (24) above, the variable $K_w$, represents the constant LQR baseline control gain, where $K_{lqr} \in R^{n \times m}$, and the variable $\hat{x}$ represents the estimate of the state vector. The baseline control module 330 may further expand the relationship as described above in Equation (24) by replacing the variable $\hat{x}$ in Equation (25) below:

$$u = -K_{lqr}(sI_{n \times n} - A_{obs})^{-1}(B_{cmd}y_{cmd} + L_v y_{meas}) \qquad \text{Equation (25)}$$

In the illustrated example of Equation (25) above, the term $(sI_{n \times n} - A_{obs})^{-1}$ represents the transfer function of the one or more observer models utilized by the observer module 320. The baseline control module 330 may determine the control input u based on Equation (25) above.

In the illustrated example of FIG. 3, the second vehicle controller 300 includes the vehicle module 340 to execute a command of the vehicle. The vehicle module 340 may include and/or otherwise implement a plant (e.g., a system) represented by one or more transfer functions, where the transfer functions may be mathematical representations utilized to describe inputs and outputs of the vehicle. The vehicle module 340 may include the plant to combine a process and an actuator. For example, the vehicle module 340 may include the plant to represent a control surface (e.g., one of the slats 114, 116, one of the flaps 118, 120, one of the elevators 130, 132, etc.) of the aircraft 100. The plant may include a transfer function to represent an actuator and/or a sensor monitoring the actuator of the aircraft control surface. For example, the plant may include a transfer function to represent one(s) of the actuators 148, 150 and/or one(s) of the third sensor 142 and/or the fourth sensor 144 monitoring the actuators 148, 150 of the elevators 130, 132.

In some examples, the plant corresponds to and/or otherwise represents plant dynamics. For example, the plant may correspond to aircraft longitudinal dynamics of the aircraft 100. In such examples, the aircraft longitudinal dynamics may be implemented with one or more longitudinal flight equations of motion. For example, the aircraft longitudinal dynamics may correspond to a first velocity of the aircraft 100 along a body axis of the aircraft 100, a second velocity of the aircraft 100 perpendicular to the body axis of the aircraft 100, an angle (e.g., a body angle) between the body axis and the horizontal axis of the aircraft 100, an angular velocity of the aircraft 100, etc., and/or a combination thereof.

In some examples, the vehicle module 340 may invoke the plant to determine an elevator angle associated with one(s) of the elevators 130, 132 of FIG. 1. For example, the vehicle module 340 may determine the elevator angle based on a measurement from a position sensor (e.g., the third sensor 142 of FIG. 1) monitoring the first elevator 130. In some examples, the vehicle module 340 may determine a thrust of the aircraft 100 based on a thrust generated by the engines 110, 112 of FIG. 1. For example, the vehicle module 340 may determine the thrust based on a measurement from a pressure sensor, a temperature, etc., and/or a combination thereof (e.g., the second sensor 140 of FIG. 1). In some examples, the vehicle module 340 may invoke the plant to determine the first velocity and/or the second velocity of the aircraft 100 based on the thrust. In some examples, the vehicle module 340 may invoke the plant to determine the body angle of the aircraft 100 based on the elevator angle. In some examples, the vehicle module 340 may invoke the plant to determine the angular velocity of the aircraft 100 based on at least one of the elevator angle or the thrust. In some examples, the vehicle module 340 may invoke the plant to determine the longitudinal dynamics of the aircraft 100 based on at least one of the first velocity, the second velocity, the body angle, or the angular velocity.

In some examples, the vehicle module 340 includes one or more state-space relationships. The vehicle module 340 may obtain the control input (e.g., the control input u) from the baseline control module 330. The vehicle module 340 may achieve bounded command tracking in the vehicle. For example, the vehicle module 340 may evaluate the one or more state-space relationships using the control input u to determine a regulated output $y_{reg}$ to follow the external bounded time-varying command $y_{cmd}$. The vehicle module 340 may be represented by and/or otherwise implement the state-space relationships as described below in Equation (26), Equation (27), and Equation (28):

$$\dot{x} = Ax + B\Lambda(u + \Theta^T \Phi(x)) + B_{ref} y_{cmd} \qquad \text{Equation (26)}$$

$$y = Cx \qquad \text{Equation (27)}$$

$$y_{reg} = C_{reg} x \qquad \text{Equation (28)}$$

For example, the vehicle module 340 may include one or more logic circuits that implement the state-space relationships as described above in Equation (26), Equation (27), and/or Equation (28). In the illustrated example of Equation (26) above, the state matrix A, the input matrix B, and the reference input matrix $B_{ref}$, are known matrices, where $A \in R^{n \times n}$, $(B, B_{ref}) \in R^{n \times m}$. In some examples, (A, B) is controllable and rank B=m (i.e., B has full column rank). In some instances, (A, C) is observable and rank C=p (i.e., C has full row rank). In some examples, the number of outputs (e.g., measured outputs) is greater than the number of inputs (e.g., control inputs) (i.e., p>m) where rank (CB)=m. In the illustrated example of Equation (26) above, the system state is $x \in R^n$, and the control input is $u \in R^m$. Further, in the illustrated example of Equation (26) above, the variable $\Lambda$ is a constant unknown non-singular positive diagonal matrix representing the system uncertainties where $\Lambda \in R^{m \times m}$. Additionally, in the illustrated example of Equation (26) above, the variable $\Theta$ is a constant unknown matrix where $\Theta \in R^{n \times m}$, and the variable $\Phi$ represents a known regressor vector where $\Phi \in R^n$. In some examples, the regressor is globally Lipschitz continuous in x, where there exists a finite positive known constant $0 < L_\Phi < \infty$, such that the relationship described below in Equation (29) holds true for any $x_1, x_2 \in R^n$:

$$\|\Phi(x_1) - \Phi(x_2)\| \leq L_\Phi \|x_1 - x_2\| \quad \text{Equation (29)}$$

In the illustrated examples of Equation (27) above and Equation (28) above, the output matrix C and the regulated output matrix $C_{reg}$ are known matrices, where $C \in R^{p \times n}$ and $C_{reg} \in R^{m \times n}$. In the illustrated examples of Equation (27) above and Equation (28) above, the system measurements are grouped into $y \in R^p$, the regulated output is $y_{reg} \in R^m$, and $y_{cmd} \in R^m$ denotes the external bounded time-varying command for $y_{reg}$ to track. In the illustrated example of Equation (28) above, the regulated output dynamics (e.g., the regulated outputs $y_{reg}$) may be non-minimum phase and have a vector relative degree greater than unity.

In the illustrated example of FIG. 3, the second vehicle controller 300 includes the sensor(s) 350 to obtain measurement(s) of the vehicle. For example, the sensor(s) 350 may implement, include, and/or otherwise correspond to one or more sensors of a vehicle, such as the aircraft 100. For example, the sensor(s) 350 may monitor, determine, and/or otherwise measure a state of an output of the aircraft 100. In some examples, the output may be a state of a parameter such as, for example, an angle of attack, a pitch angle, a pitch rate, a first flex mode position, a second flex mode position, a first flex mode velocity, a second flex mode velocity, etc., of a control surface of the aircraft 100, and/or, more generally, the aircraft 100. The output measurement may also be represented as a linear combination of the states such as vertical acceleration. In some examples, the sensor(s) 350 implement one(s) of the sensors 138, 140, 142, 144 of FIG. 1. For example, the sensor(s) 350 may be implemented with one or more sensors such as an accelerometer, an altimeter, a gyro sensor, a pressure sensor, a speed sensor, a temperature sensor, etc. Additionally or alternatively, the sensor(s) 350 may be implemented with any number of and/or types of sensors operating on the aircraft 100, a land-based vehicle, or marine-based vehicle.

In the illustrated example of FIG. 3, the second vehicle controller 300 includes the network 360. The sensor(s) 350 may be in communication with the network 360. The network 360 of the illustrated example of FIG. 3 may implement a process control network (e.g., an aircraft process control network, a vehicle network, etc.). However, the example network 360 may be implemented using any suitable wired and/or wireless network(s) including, for example, one or more data buses, one or more aircraft process control networks, one or more Local Area Networks (LANs), one or more wireless LANs, one or more cellular networks, one or more private networks, one or more public networks, etc. The network 360 enables the sensor(s) 350 to be in communication with the collection module 370.

In the illustrated example of FIG. 3, the second vehicle controller 300 includes the collection module 370 to query, filter, obtain, process, and/or select a measurement. In some examples, the collection module 370 obtains measurement(s) from the sensor(s) 350 via the network 360. In some examples, the collection module 370 obtains the measurement(s) from the sensor(s) 350 directly (e.g., without the network 360). The collection module 370 may obtain unprocessed information (e.g., non-manipulated data from the sensor(s) 350, non-scaled data from the sensor(s) 350, etc.) or processed information (e.g., manipulated data from the sensor(s) 350, scaled data from the sensor(s) 350, etc.). In some examples, the collection module 370 stores sensor information (e.g., sensor data, sensor measurement(s), etc.) in the datastore 380.

In some examples, the collection module 370 selects obtained sensor measurements of interest to be used by one or more algorithms, processes, programs, techniques, etc. deployed by the second vehicle controller 300. For example, the collection module 370 may process a value from a sensor measurement by converting (e.g., converting using a conversion calculation, converting to different units of measure, etc.), scaling (e.g., scaling using a scaling factor), and/or translating (e.g., translating using a pre-determined curve, translating using a pre-determined equation) the value from the sensor measurement for use by the observer module 320 and, more generally, the second vehicle controller 300. In some examples, the collection module 370 selects the sensor measurement by querying the datastore 380. In response to the datastore 380 receiving the query sent from the collection module 370, the datastore 380 transmits the sensor measurement to the collection module 370. In some examples, the collection module 370 obtains a query from the observer module 320 and/or the error module 390 for a sensor measurement of interest. In response to the collection module 370 receiving the query, the collection module 370 may transmit the sensor measurement of interest to the observer module 320 and/or the error module 390.

In the illustrated example of FIG. 3, the second vehicle controller 300 includes the datastore 380 to record data (e.g., obtained sensor information, calculated sensor measurement values, look-up tables, etc.). In some examples, the datastore 380 stores a pre-defined look-up table that includes values for gain parameters. For example, observer module 320 and/or the baseline control module 330 may query the look-up table in the datastore 380 to obtain a gain value to be used in one or more calculations. In some examples, the look-up table may store and/or otherwise include associations, relationships, etc., between values of parameters and gain values. For example, the observer module 320 may identify a gain value by mapping a value of a parameter to a first association in the look-up table between the value of the parameter and the gain value.

In some examples, the datastore 380 may be implemented by a volatile memory (e.g., a Synchronous Dynamic Random Access Memory (SDRAM), Dynamic Random Access Memory (DRAM), RAIVIBUS Dynamic Random Access Memory (RDRAM), etc.) and/or a non-volatile memory (e.g., flash memory). The datastore 380 may additionally or alternatively be implemented by one or more double data rate (DDR) memories, such as DDR, DDR2, DDR3, mobile DDR (mDDR), etc. The datastore 380 may additionally or alternatively be implemented by one or more mass storage devices such as hard disk drive(s) (HDD(s)), compact disk (CD) drive(s), digital versatile disk (DVD) drive(s), magnetic media, etc. While in the example the datastore 380 is illustrated as a single datastore, the datastore 380 may be implemented by any number and/or type(s) of datastores.

In the illustrated example of FIG. 3, the second vehicle controller 300 includes the error module 390 to determine an error estimation value. In some examples, the error module 390 may calculate a difference between a measured (true or known) value of a state of a parameter and an estimate value of the state of the parameter. For example, the error module 390 may obtain the measured value from the collection module 370. In such examples, the error module 390 may identify a first value of a state of a pitch rate of the aircraft 100, where the first value is measured from one of the sensors 138, 140, 142, 144, such as a gyro sensor. In some examples, the error module 390 may identify a second value of the state of the pitch rate of the aircraft 100, where the second value is an estimate value of the state of the pitch rate obtained from the observer module 320. In some examples, the error module 390 may determine a difference (e.g., an error estimation value) between the first value and the second value. In response to the error module 390 determining the difference, the error module 390 may transmit the difference to the observer module 320. For example, the error module 390 may transmit, deliver, and/or otherwise provide the error estimation value to the observer module 320 to improve the state estimating functions of the observer module 320, and/or, more generally, improve control of flight operations of the aircraft 100, such as a flight operation during the flare regime 220 of FIG. 2.

Figure 4:
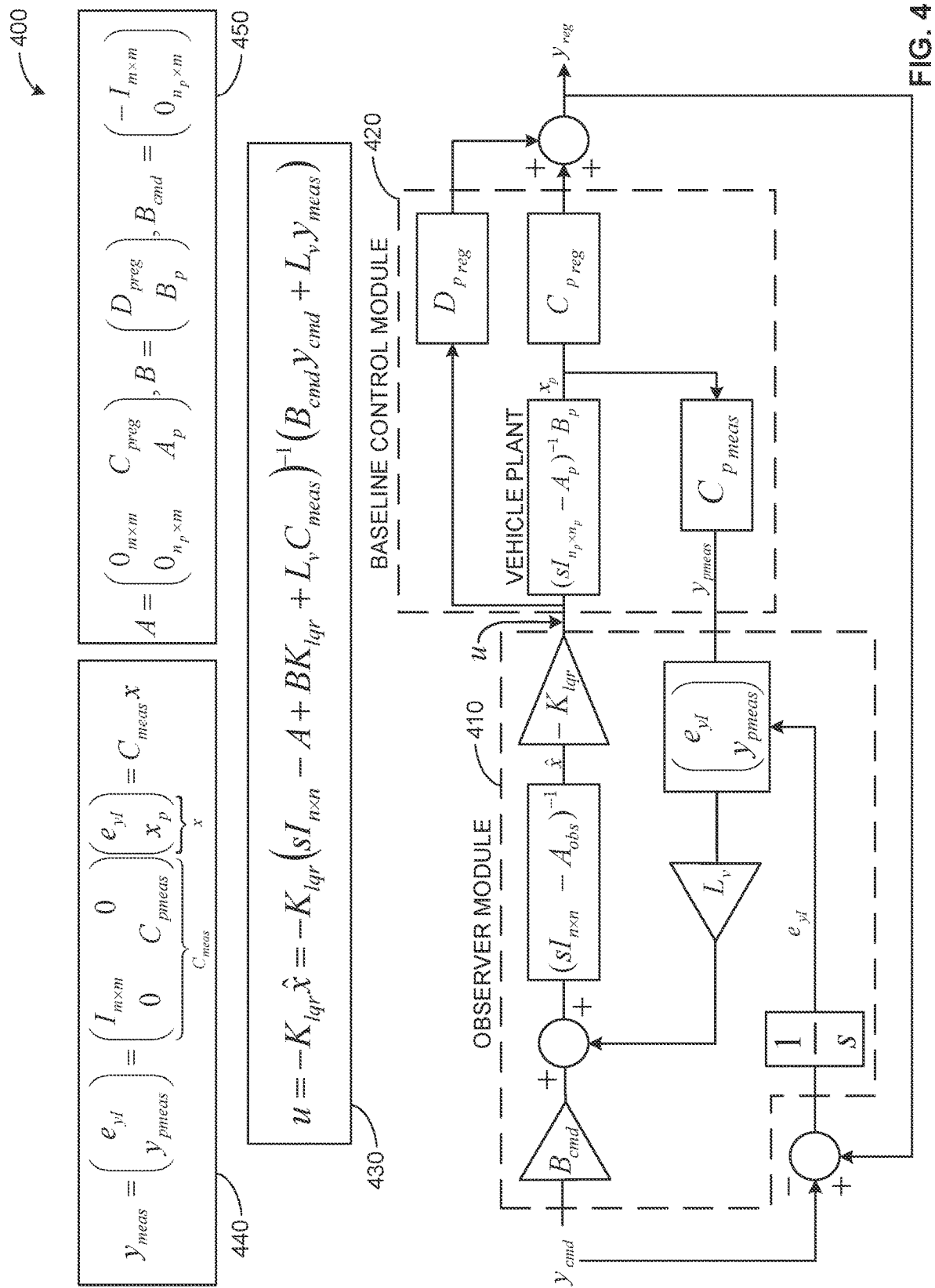
FIG. 4 is a block diagram of a second example implementation of the example vehicle controller of FIG. 1.

FIG. 4 is a block diagram of an example implementation of a third example vehicle controller 400. In some examples, the third vehicle controller 400 may be an example implementation of the first vehicle controller 102 of FIG. 1, and/or the second vehicle controller 300 of FIG. 3. In some examples, the third vehicle controller 400 controls a vehicle, such as the aircraft 100 of FIGS. 1 and/or 2, with a generated command based on measurement(s) from one or more sensors (e.g., one(s) of the sensors 138, 140, 142, 144 of FIG. 1). For example, the third vehicle controller 400 may control one or more control surfaces of the aircraft 100 with a generated control surface command based on measurement(s) from one(s) of the sensors 138, 140, 142, 144.

In the illustrated example of FIG. 4, the third vehicle controller 400 includes an example observer module 410 and an example baseline control module 420. In some examples, the observer module 410 is an example implementation of the observer module 320 of FIG. 3. In some examples, the baseline control module 420 is an example implementation of the baseline control module 330 of FIG. 3. Additionally or alternatively, the third vehicle controller 400 may include one(s) of the command input module 310, the observer module 320 (e.g., to implement a dual-observer model of the vehicle), the vehicle module 340, the sensor(s) 350, the network 360, the collection module 370, the datastore 380, and/or the error module 390 of FIG. 3.

In the illustrated example of FIG. 4, the third vehicle controller 400 includes the observer module 410 to at least determine a control input to the baseline control module 420. The observer module 410 obtains a bounded command $y_{cmd}$. In some examples, the observer module 410 obtains the bounded command $y_{cmd}$ from a command input module such as, for example, the command input module 310 from FIG. 3. In this example, the variable $B_{cmd}$ represents a gain command value, the transfer function $(sI_{n\times n} - A_{obs})^{-1}$ represents a transfer function of the observer model utilized by the observer module 410, and the variable $\hat{x}$ represents the estimate of the state vector. In this example, the variable $I_{n\times n}$ represents an identity matrix of size n×n. The designator obs in the observer module 410 is representative of and/or otherwise indicates the observer model. For example, the variable $A_{obs}$ represents a state matrix of the observer model. In this example, the variable $K_{lqr}$ represents a LQR constant gain and the variable $L_v$ represents the observer error feedback gain. In this example, the variable $e_{yI}$ represents an output observation error based on a difference of the variables $y_{reg}$ and $y_{cmd}$ applied to an integrator transfer function $$\frac{1}{s}.$$

The variable $y_{reg}$ represents a regulated output of the baseline control module 420 based on the control input u generated by the observer module 410.

In the illustrated example of FIG. 4, the third vehicle controller 400 includes the variable u to represent the control input. In some examples, the control input u includes and/or otherwise implements the adaptive control input $u_{ad}$ as described above. In this example, the control input u is represented by a relationship as described by an equation in block 430, where the control input u is based on the LQR gain $K_{lqr}$ and the estimate of the state vector $\hat{x}$. In block 430, the variable $y_{meas}$ represents a measured output of the third vehicle controller 400. In this example, the measured output $y_{meas}$ may also represent the input to the observer error feedback gain $L_v$. The measured output $y_{meas}$ may be represented by the mathematical relationships as described in block 440.

In the illustrated example of block 440, the measured output $y_{meas}$ is based on the output observation error $e_{yI}$ and the measured plant output $y_{p\ meas}$. The output observation error $e_{yI}$ may be based on the identity matrix $I_{m\times m}$, where the identity matrix is size m×m. The measured output $y_{meas}$ may be based on the plant measured matrix $C_{p\ meas}$. The matrix $C_{meas}$ may represent a measured output matrix and may be based on the identity matrix $I_{m\times m}$ and the plant measured matrix $C_{p\ meas}$. In the illustrated example of block 440, the variable x represents a state vector of the vehicle based on the output observation error $e_{yI}$ and the state vector of the vehicle plant $x_p$ (e.g., the state vector of the vehicle). As represented in block 440, the measured output $y_{meas}$ is based on the measured output matrix $C_{meas}$ and the state vector x.

In the illustrated example of block 430, the variables A, B, and $B_{cmd}$ represent the state matrix of the vehicle, the input matrix of the vehicle, and the gain command matrix of the vehicle, respectively. The variables A, B, and $B_{cmd}$ are represented by the equations described in block 450. In this example, the state matrix A is based on the variables $0_{m\times m}$, $0_{n_p\times m}$, $C_{p\ reg}$, and $A_p$. The variable $0_{m\times m}$ represents a zero matrix of size m×m, the variable $0_{n_p\times m}$ represents a zero matrix of size $n_p$×m, the variable $C_{p\ reg}$ represents a regulated output matrix of the vehicle plant, and the variable $A_p$ represents the state matrix of the vehicle plant. In the illustrated example, the input matrix B is based on $D_{p\ reg}$ and $B_p$. The variable $D_{p\ reg}$ represents a regulated feedforward matrix of the vehicle plant, and the variable $B_p$ represents an input matrix of the vehicle plant. In the illustrated example, the gain command matrix $B_{cmd}$ is based on the variables $-I_{m\times m}$ and the variable $0_{n_p\times m}$. The variable $-I_{m\times m}$ represents a negative identity matrix of size m×m and the variable $0_{n_p \times m}$ represents a zero matrix of size $n_p \times m$.

In the illustrated example of FIG. 4, the third vehicle controller 400 includes the vehicle plant $(sI_{n_p \times n_p} - A_p)^{-1} B_p$ to represent the vehicle, such as the aircraft 100. For example, the vehicle plant may represent an air-based vehicle (e.g., the aircraft 100, a UAV, etc.), a land-based vehicle (e.g., an automobile, a bus, a train, etc.), a marine vehicle (e.g., a boat, a submarine), etc. In some examples, the vehicle plant is a portion or represents one or more components of the vehicle. For example, the vehicle plant may be representative of one or more control surfaces operatively coupled to one of the wings 104, 106 of the aircraft 100, an actuator operatively coupled to a valve of a marine vehicle, etc. In this example, the variable $I_{n_p \times n_p}$ represents an identity matrix of size $n_p \times n_p$. The designator p in the baseline control module 420 variables correspond to the plant. For example, the variable $A_p$ represents a state matrix of the vehicle plant, the variable $B_p$ represents an input matrix of the vehicle plant, the variable $x_p$ represents a state of the vehicle plant, the variable $I_{n_p \times n_p}$ represents an identity matrix of the vehicle plant, etc. In the illustrated example, the variable $C_{p\ reg}$ represents a regulated output matrix of the vehicle plant, the variable $D_{p\ reg}$ represents a regulated feedforward matrix of the vehicle plant, and the variable $C_{p\ meas}$ represents a measured output matrix of the vehicle plant.

In the illustrated example of FIG. 4, the third vehicle controller 400 utilizes the observer module 410 to determine the estimate of the state vector $\hat{x}$ of an observer model based on the bounded command $y_{cmd}$. In some examples, the observer module 410 may improve the estimating functions of the observer module 410 (e.g., determining the estimate of the state vector $\hat{x}$) by determining the output observation error $e_{yI}$. In some examples, the observer module 410 may improve the estimating functions of the observer module 410 by obtaining the measured plant output $y_{p\ meas}$ from the baseline control module 420. In some examples, the observer module 410 obtains the measured plant output $y_{p\ meas}$ from a collection module (e.g., the collection module 370 of FIG. 3), a sensor (e.g., one(s) of the sensors 138, 140, 142, 144 of FIG. 1, the sensor(s) 350 of FIG. 3, etc.), etc.

Figure 5:
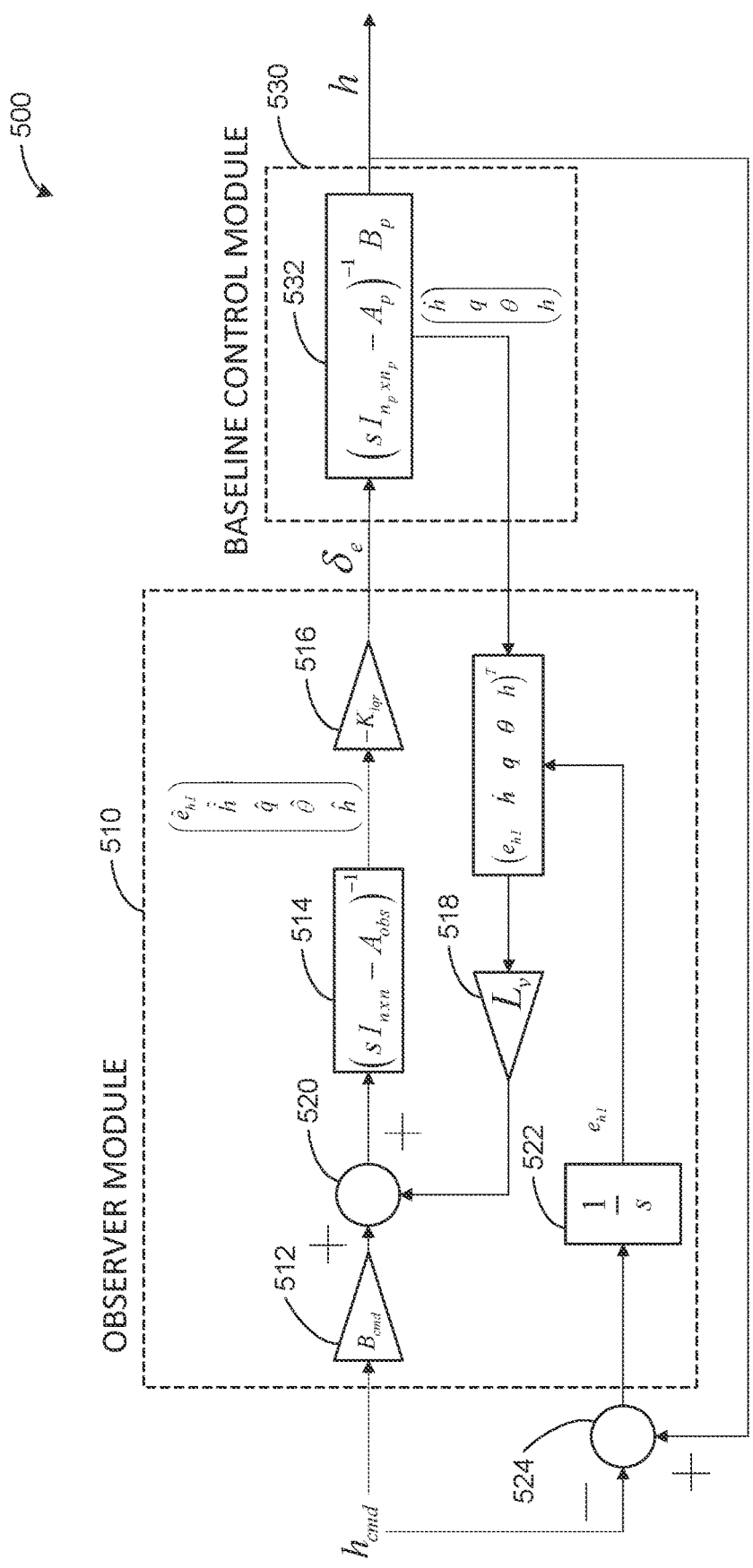
FIG. 5 is a block diagram of a third example implementation of the example vehicle controller of FIG. 1.

FIG. 5 is a block diagram of an example implementation of a fourth example vehicle controller 500 that performs, executes, and/or otherwise effectuates flight control of an air-based vehicle, such as the aircraft 100 of FIG. 1. In some examples, the fourth vehicle controller 500 implements the first vehicle controller 102 of FIG. 1, the second vehicle controller 300 of FIG. 3, and/or the third vehicle controller 400 of FIG. 4. In the illustrated example of FIG. 5, the fourth vehicle controller 500 includes an example observer module 510 and an example baseline control module 530. In some examples, the observer module 510 may implement the observer module 320 of FIG. 3 and/or the observer module 410 of FIG. 4. In some examples, the baseline control module 530 may implement the baseline control module 330 of FIG. 3 and/or the baseline control module 420 of FIG. 4. Additionally or alternatively, the fourth vehicle controller 500 may include one(s) of the command input module 310, the observer module 320 (e.g. to implement a dual-observer model of the aircraft 100), the vehicle module 340, the sensor(s) 350, the network 360, the collection module 370, the datastore 380, and/or the error module 390 FIG. 3.

In the illustrated example of FIG. 5, the fourth vehicle controller 500 performs control of aircraft altitude in the flare regime 220 of the flight plan 202 of FIG. 2. For example, during the flare regime 220, the fourth vehicle controller 500 may control the aircraft 100 from an approach glide path (e.g., the preflare aircraft flight path 210 of FIG. 2) to a smooth touchdown at a desired location (e.g., at the touchdown location 214 within the touchdown zone 216) and at a desired sink rate (e.g., an altitude rate).

In the illustrated example of FIG. 5, the fourth vehicle controller 500 determines an estimate of a state of the altitude $\hat{h}$ based on an altitude command $h_{cmd}$. For example, the altitude command $h_{cmd}$ may implement and/or otherwise correspond to a trajectory of the aircraft 100. For example, the trajectory may correspond to a trajectory from a current setpoint of the aircraft 100 to the touchdown location 214 as a function of time. In this example, the baseline control module 530, and/or, more generally, the fourth vehicle controller 500, determines an altitude command output h based on an altitude control input $\delta_e$. For example, the altitude command output h may implement a regulated output at a specified point during the flight plan 202 that the fourth vehicle controller 500 causes the aircraft 100 to follow at a specified time. In some examples, the altitude command $h_{cmd}$ is a bounded altitude command.

In some examples, the altitude control input $\delta_e$ implements a control surface command for a control surface of the aircraft 100. For example, the observer module 510, and/or, more generally, the fourth vehicle controller 500, may generate the altitude control input $\delta_e$ to control one(s) of the elevators 130, 132 of FIG. 1. In some examples, the observer module 510 may generate the altitude control input $\delta_e$ to cause the first elevator 130 and/or the second elevator 132 to move from a first position to a second position (e.g., move up or down by one or more degrees, radians, etc.).

In the illustrated example of FIG. 5, the observer module 510 includes a gain command value $B_{cmd}$ 512, a transfer function 514 of the observer model $(sI_{n \times n} - A_{obs})^{-1}$ (e.g. a dynamic compensator), a LQR constant gain $K_{lqr}$ 516, and an observer error feedback gain $L_v$ 518. In this example, adder logic 520 determines input(s) to the transfer function 514 based on a sum of the gain command value 512 and the observer error feedback gain 518. In some examples, the gain command value 512 is determined based on value(s) of parameter(s) of the aircraft 100. For example, the observer module 510 may map one or more values of parameters to the gain command value 512 in a look-up table. In some examples, the observer module 510 may map at least one of a value of a speed parameter (e.g., an airspeed parameter) of the aircraft 100, a value of an altitude of the aircraft 100, or a value of a configuration (e.g., a length, a width, a weight, etc.) of the aircraft 100 to a look-up table to identify the gain command value 512. In some examples, the look-up table is stored in the datastore 380 of FIG. 3.

In some examples, the LQR constant gain 516 is determined based on value(s) of parameter(s) of the aircraft 100. For example, the observer module 510 may map one or more values of parameters to the LQR constant gain 516 in a look-up table. In some examples, the observer module 510 may map at least one of a value of a speed parameter (e.g., an airspeed parameter) of the aircraft 100, a value of an altitude of the aircraft 100, or a value of a configuration (e.g., a length, a width, a weight, etc.) of the aircraft 100 to a look-up table to identify the LQR constant gain 516. In some examples, the look-up table is stored in the datastore 380 of FIG. 3.

In some examples, $A_{obs}$ is defined as a matrix (e.g., a 5×5 matrix or a matrix of any other size). In some such examples, the observer module 510 identifies values of the matrix based on flight conditions of the aircraft 100, such as value(s) of parameters of the aircraft 100. For example, the observer module 510 may map at least one of a value of a speed parameter (e.g., an airspeed parameter) of the aircraft 100, a value of an altitude of the aircraft 100, or a value of a configuration (e.g., a length, a width, a weight, etc.) of the aircraft 100 to one or more look-up tables (e.g., one or more look-up tables stored in the datastore 380 of FIG. 3). In some examples, the observer module 510 may determine one or more values of the matrix based on the mapping. For example, the observer module 510 may determine $A_{obs}$ based on value(s) of parameter(s) of the aircraft 100.

In this example, the variable $e_{hI}$ represents an output observation error based on a difference of the variables h and $k_{cmd}$ applied to an integrator transfer function 1/s 622. In this example, the difference is determined by subtraction logic 524. In the illustrated example, the variable $\hat{e}_{hI}$ represents an estimate of the output observation error $e_{hI}$ and the variables $(\hat{\dot{h}}, \hat{q}, \hat{\theta})$ represent estimates of parameters of aircraft altitude rate $\dot{h}$, pitch rate q, and pitch angle $\theta$, respectively. For example, the observer module 510 may implement a filter of sensed or measured values of the aircraft altitude rate $\dot{h}$, pitch rate q, and pitch angle $\theta$ parameters to yield and/or otherwise determine the estimates of the parameters $(\hat{\dot{h}}, \hat{q}, \hat{\theta})$.

In the illustrated example of FIG. 5, the baseline control module 530 implements plant dynamics (e.g., aircraft longitudinal dynamics associated with the aircraft 100). For example, the baseline control module 530 includes an aircraft plant $(sI_{n_p \times n_p} - A_p)^{-1} B_p$ 532, which represents a linear representation of the plant dynamics of the aircraft 100. In this example, the designator p utilized in the baseline control module 530 represents the plant dynamics. For example, the variable $A_p$ represents a state matrix of the plant dynamics and the variable $B_p$ represents an input matrix of the plant dynamics.

In some examples, the aircraft altitude rate $\dot{h}$, the pitch rate q, and the pitch angle $\theta$ may be determined based on measurement(s) from sensor(s), such as one(s) of the sensors 138, 140, 142, 144 of FIG. 1, the sensor(s) 350 of FIG. 3, etc. For example, the baseline control module 530 may invoke the plant dynamics to determine an elevator angle associated with one(s) of the elevators 130, 132 of FIG. 1. In some examples, the baseline control module 530 may determine the elevator angle based on a measurement from a position sensor (e.g., the third sensor 142 of FIG. 1) monitoring the first elevator 130. In some examples, the baseline control module 530 may determine a thrust of the aircraft 100 based on a thrust generated by the engines 110, 112 of FIG. 1. For example, the baseline control module 530 may determine the thrust based on a measurement from a pressure sensor, a temperature, etc., and/or a combination thereof (e.g., the second sensor 140 of FIG. 1).

In some examples, the baseline control module 530 may invoke the plant dynamics to determine aircraft altitude rate $\dot{h}$ based on the elevator angle and/or the thrust. In some examples, the baseline control module 530 may invoke the plant dynamics to determine the pitch rate q based on the elevator angle and/or the thrust. In some examples, the baseline control module 530 may invoke the plant dynamics to determine the pitch angle $\theta$ based on the elevator angle.

In example operation, the fourth vehicle controller 500 may perform observer-based landing control of the aircraft 100. For example, the observer module 510 may execute the transfer function 514 to determine first states, such as estimates of the output observation error $\hat{e}_{hI}$, the aircraft altitude rate $\hat{\dot{h}}$, the pitch rate $\hat{q}$, the pitch angle $\hat{\theta}$, and the altitude $\hat{h}$. In example operation, the observer module 510 applies the LQR constant gain 516 to the first states to determine the altitude control input $\delta_e$.

In example operation, the baseline control module 530 may execute the aircraft plant 532 to determine second states, such as measured, sensed, and/or otherwise known values of the aircraft altitude rate $\dot{h}$, the pitch rate q, the pitch angle $\theta$, and the altitude h. For example, the baseline control module 530 may determine the second states of the aircraft 100 based on the aircraft 100 executing the altitude control input $\delta_e$. For example, the fourth vehicle controller 500 may determine the second states based on the elevators 130, 132 of FIG. 1 moving and/or otherwise actuating based on the altitude control input $\delta_e$.

In example operation, the observer module 510 may transpose the measured aircraft altitude rate $\dot{h}$, pitch rate q, pitch angle $\theta$, and altitude h along with the output observation error $e_{hI}$. The observer module 510 may apply the observer error feedback gain 518 to the transposed one(s) of the measured aircraft altitude rate $\dot{h}$, pitch rate q, pitch angle $\theta$, altitude h, and output observation error $e_{hI}$. The adder logic 520 may add the output(s) of such an operation and the gain command value 512 to determine the input(s) to the transfer function 514.

In example operation, the fourth vehicle controller 500 may determine third states, such as new or updated estimate of the first states, based on the difference between the altitude command $h_{cmd}$ and the altitude command output h. For example, the subtraction logic 524 may determine the difference between the altitude command $h_{cmd}$ and the altitude command output h, which may be used to determine the output observation error $e_{hI}$. The observer module 510 may use the output observation error $e_{hI}$ to determine the third states, such as new or updated values of the estimates of the output observation error $\hat{e}_{hI}$, the aircraft altitude rate $\hat{\dot{h}}$, the pitch rate $\hat{q}$, the pitch angle $\hat{\theta}$, and the altitude $\hat{h}$, using the transfer function 514. Advantageously, the observer module 510 may determine and/or generate an updated altitude control input $\delta_e$ to control one or more flight control surfaces of the aircraft 100 during the flare regime 220, such as one(s) of the elevators 130, 132 based on the difference between the first states and the second states.

While an example manner of implementing the first vehicle controller 102 of FIG. 1, the second vehicle controller 300 of FIG. 3, the third vehicle controller 400 of FIG. 4, and/or fourth vehicle controller 500 of FIG. 5 in depicted in FIGS. 3, 4, and/or 5, one or more of the elements, processes, and/or devices illustrated in FIGS. 3, 4, and/or 5 may be combined, divided, re-arranged, omitted, eliminated, and/or implemented in any other way. Further, one(s) of the example command input module 310, the example observer module 320, the example baseline control module 330, the example vehicle module 340, the example sensor(s) 350, the example network 360, the example collection module 370, the example datastore 380, and/or the example error module 390 of FIG. 3, one(s) of the example observer module 410 and/or the example baseline control module 420 of FIG. 4, and/or one(s) of the example observer module 510, the example gain command value 512, the example transfer function 514, the example LQR constant gain 516, the example error observer feedback gain 518, the example adder logic 520, the example integrator transfer function 522, the example subtraction logic 524, the example baseline control module 530, and/or the example aircraft plant 532 of FIG. 5, and/or, more generally, one(s) of the first example vehicle controller 102, the second example vehicle controller 300, the third example vehicle controller 400, and/or the fourth example vehicle controller 500, may be implemented by hardware, software, firmware and/or any combination of hardware, software and/or firmware. Thus, for example, any of the example command input module 310, the example observer module 320, the example baseline control module 330, the example vehicle module 340, the example sensor(s) 350, the example network 360, the example collection module 370, the example datastore 380, the example error module 390, the example observer module 410, the example baseline control module 420, the example observer module 510, the example gain command value 512, the example transfer function 514, the example LQR constant gain 516, the example error observer feedback gain 518, the example adder logic 520, the example integrator transfer function 522, the example subtraction logic 524, the example baseline control module 530, the example aircraft plant 532, and/or, more generally, the first example vehicle controller 102, the second example vehicle controller 300, the third example vehicle controller 400, and/or the fourth example vehicle controller 500 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)) (e.g., field programmable gate array (FPGA) device(s) (FPGA(s))). When reading any of the apparatus or system claims of this patent to cover a purely software and/or firmware implementation, at least one of the example command input module 310, the example observer module 320, the example baseline control module 330, the example vehicle module 340, the example sensor(s) 350, the example network 360, the example collection module 370, the example datastore 380, the example error module 390, the example observer module 410, the example baseline control module 420, the example observer module 510, the example gain command value 512, the example transfer function 514, the example LQR constant gain 516, the example error observer feedback gain 518, the example adder logic 520, the example integrator transfer function 522, the example subtraction logic 524, the example baseline control module 530, the example aircraft plant 532, and/or, more generally, the first example vehicle controller 102, the second example vehicle controller 300, the third example vehicle controller 400, and/or the fourth example vehicle controller 500 is/are hereby expressly defined to include a tangible computer readable storage device or storage disk such as a memory, a DVD, a CD, a Blu-ray disk, etc., storing the software and/or firmware. Further still, the first example vehicle controller 102, the second example vehicle controller 300, the third example vehicle controller 400, and/or the fourth example vehicle controller 500 may include one or more elements, processes, and/or devices in addition to, or instead of, those illustrated in FIGS. 3, 4, and/or 5, and/or may include more than one of any or all of the illustrated elements, processes, and devices.

Flowcharts representative of example hardware logic, machine readable instructions, hardware implemented state machines, and/or any combination thereof for implementing the first example vehicle controller 102 of FIG. 1, the second example vehicle controller 300 of FIG. 3, the third example vehicle controller 400 of FIG. 4, and/or the fourth example vehicle controller 500 of FIG. 5 are shown in FIGS. 6-9. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6-9, many other methods of implementing the first vehicle controller 102 of FIG. 1, the second vehicle controller 300 of FIG. 3, the third vehicle controller 400 of FIG. 4, and/or the fourth vehicle controller 500 of FIG. 5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., one or more networks of a vehicle). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6-9 may be implemented using executable instructions (e.g., computer and/or machine readable instructions) stored on a non-transitory computer and/or machine readable medium such as a hard disk drive, a flash memory, a read-only memory, a compact disk, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 6:
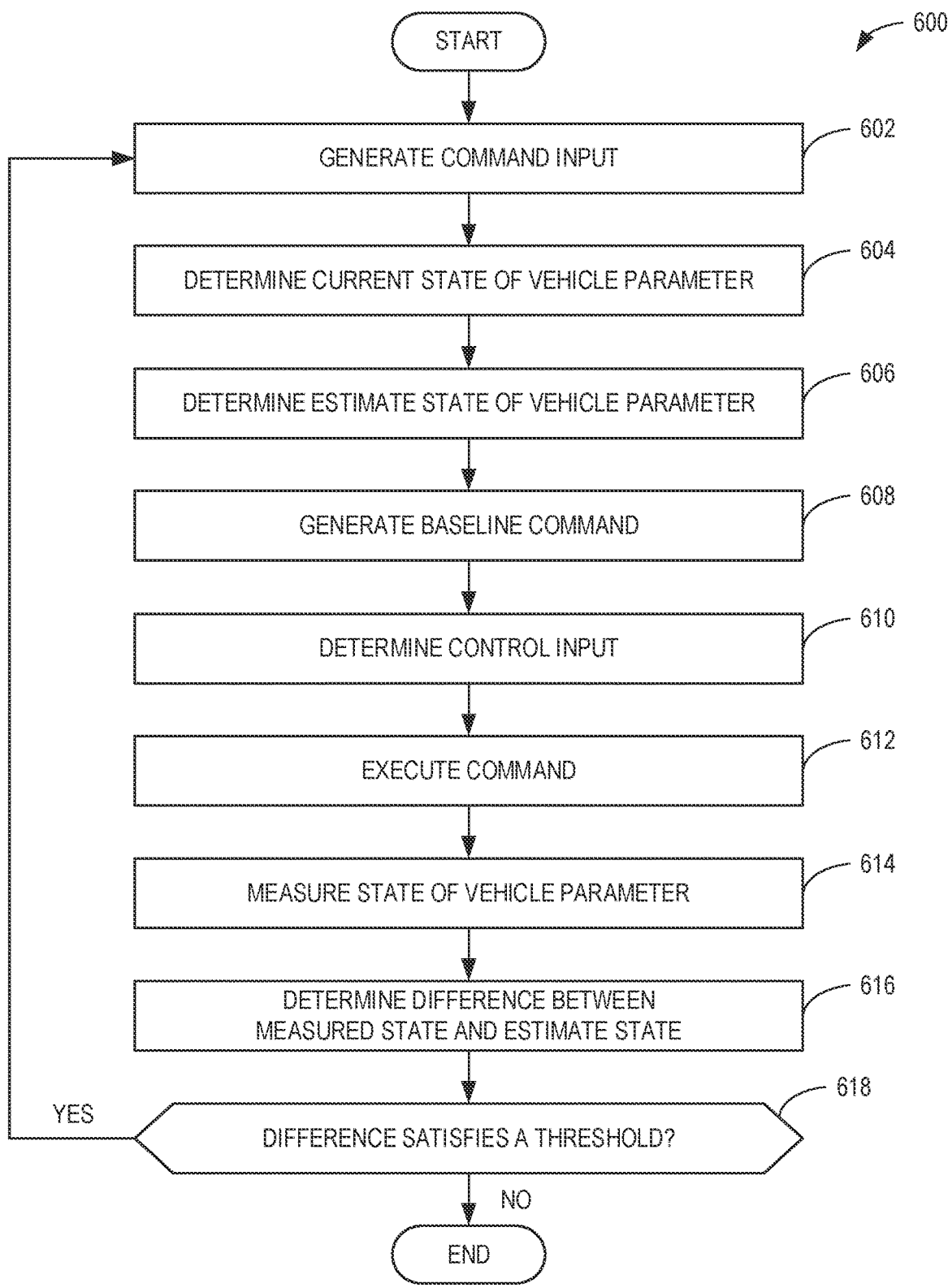
FIG. 6 is a flowchart representative of example machine readable instructions that may be executed to implement the example vehicle controller of FIGS. 1, 3, 4, and/or 5 to facilitate observer-based landing control of the example aircraft of FIGS. 1 and/or 2.

FIG. 6 is a flowchart representative of example machine readable instructions 600 that may be executed to implement the first vehicle controller 102 of FIG. 1, the second vehicle controller 300 of FIG. 3, the third vehicle controller 400 of FIG. 4, and/or the fourth vehicle controller 500 of FIG. 5 to perform observer-based landing control of the aircraft 100 of FIGS. 1 and/or 2. The example machine readable instructions 600 begin at block 602, at which the vehicle controller 102, 300, 400, 500 generates a command input. For example, the command input module 310 (FIG. 3) may generate a command input for the aircraft 100 based on pilot or unmanned control input (e.g., a command from a pilot, a computing device controlled by the pilot, a UAV computing device, etc.), a value from the datastore 380 (FIG. 3), measurement(s) from the sensor(s) 350 (FIG. 3) obtained from the collection module 370 (FIG. 3), a guidance module, etc.

At block 604, the vehicle controller 102, 300, 400, 500 determines a current state of a vehicle parameter. For example, the observer module 320 (FIG. 3), the observer module 410 (FIG. 4), and/or the observer module 510 (FIG. 5) may determine an initial state of an angle of attack parameter of the aircraft.

At block 606, the vehicle controller 102, 300, 400, 500 determines an estimate of a state of the vehicle parameter. For example, the observer module 320, 410, 510 may determine an estimate of the state of the angle of attack parameter of the aircraft 100 based on one or more observer models of the aircraft 100.

At block 608, the vehicle controller 102, 300, 400, 500 generates a baseline command. For example, the baseline control module 330 (FIG. 3), the baseline control module 420 (FIG. 4), and/or the baseline control module 530 (FIG. 5) may generate a baseline command for the aircraft 100 based on the estimate of the state of the angle of attack parameter of the aircraft 100.

At block 610, the vehicle controller 102, 300, 400, 500 determines the control input. For example, the baseline control module 330, 420, 530 may determine the control input (e.g., the control input u) based on the guidance command (e.g., the guidance command r) and/or the estimate of the state of the angle of attack parameter for the aircraft.

At block 612, the vehicle controller 102, 300, 400, 500 executes a command. For example, the vehicle module 340 (FIG. 3) may execute the command based on the control input (e.g., the control input u).

At block 614, the vehicle controller 102, 300, 400, 500 measures a state of the vehicle parameter. For example, the collection module 370 (FIG. 3) may measure the state of the angle of attack parameter based on a measurement from the sensor(s) 350 (FIG. 3). In some examples, the observer module 320, 410, 510 may measure the state of the angle of attack parameter based on the measurement from the sensor(s) 350.

At block 616, the vehicle controller 102, 300, 400, 500 determines a difference between the measured state and the estimate of the state. For example, the error module 390 may determine the difference between (1) the measured state of the angle of attack parameter based on the measurement from the sensor(s) 350 and (2) the estimate of the state of the angle of attack parameter determined by the observer module 320, 410, 510.

At block 618, the vehicle controller 102, 300, 400, 500 determines whether the difference satisfies a threshold. For example, the observer module 320, 410, 510 may determine whether the difference satisfies an estimation error threshold (e.g., a threshold indicating the difference is greater than 5 degrees, the difference is less than 10 radians/second, etc.). In some examples, the observer module 320, 410, 510 may output an updated estimate of the state of the angle of attack parameter based on the difference to improve control of the aircraft 100 based on the updated estimate.

If, at block 618, the vehicle controller 102, 300, 400, 500 determines that the difference does not satisfy the threshold, control returns to block 602 to generate another guidance command, otherwise the example machine readable instructions 600 of FIG. 6 concludes.

Figure 7:
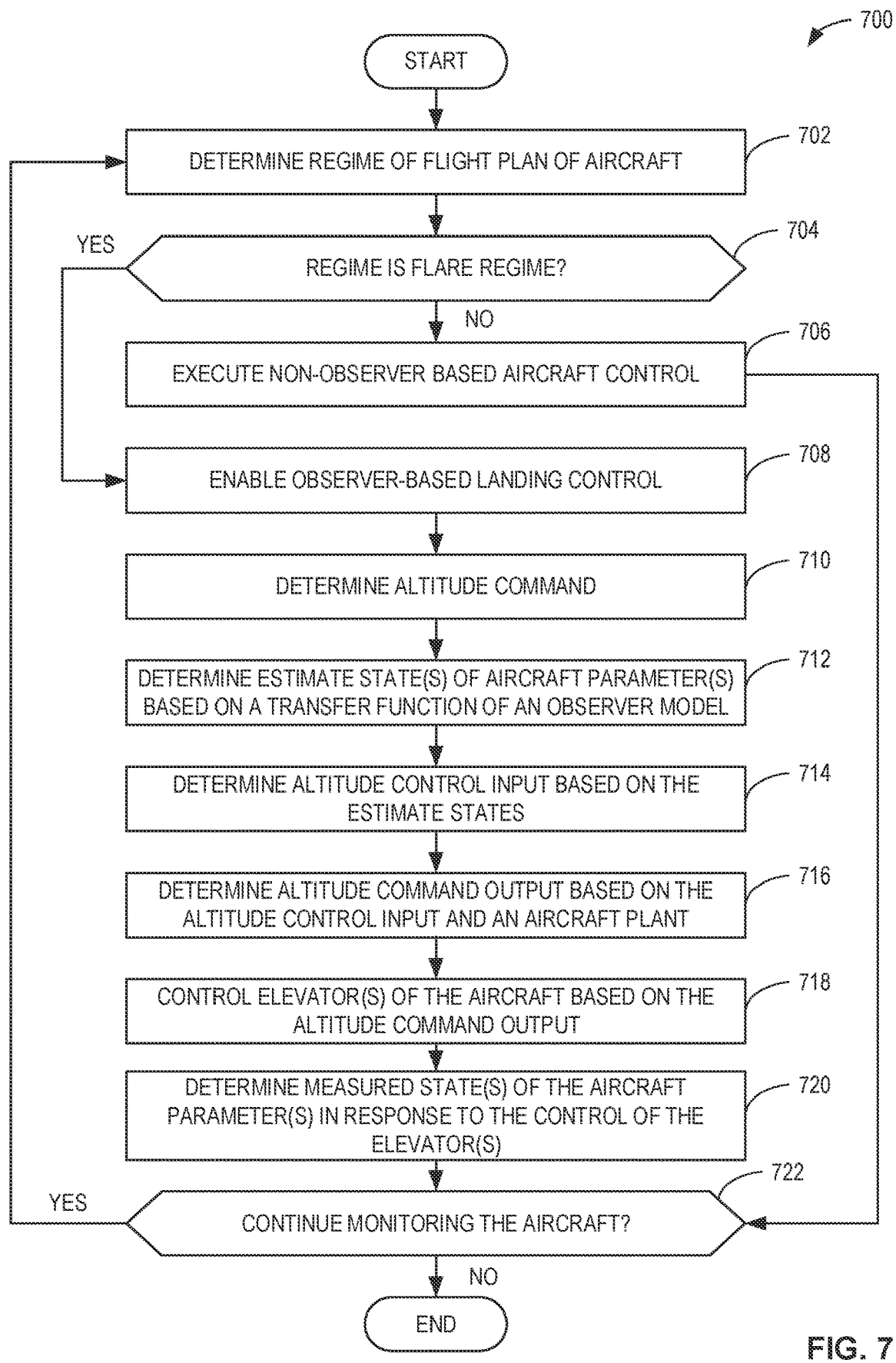
FIG. 7 is another flowchart representative of example machine readable instructions that may be executed to implement the example vehicle controller of FIGS. 1, 3, 4, and/or 5 to facilitate observer-based landing control of the example aircraft of FIGS. 1 and/or 2.

FIG. 7 is a flowchart representative of example machine readable instructions 700 that may be executed to implement the first vehicle controller 102 of FIG. 1, the second vehicle controller 300 of FIG. 3, the third vehicle controller 400 of FIG. 4, and/or the fourth vehicle controller 500 of FIG. 5 to perform observer-based landing control of the aircraft 100 of FIGS. 1 and/or 2. The example machine readable instructions 700 begin at block 702, at which the vehicle controller 102, 300, 400, 500 determines a regime of a flight plan of an aircraft. For example, the fourth vehicle controller 500 may determine that the aircraft 100 has achieved the flare engage altitude at the second waypoint 208 (FIG. 2) at a beginning of the flare regime 220 (FIG. 2). In some examples, the fourth vehicle controller 500 determines the regime of the flight plan 202 (FIG. 2) to be the flare regime 220 based on the altitude command $h_{cmd}$. In some examples, the fourth vehicle controller 500 determines the regime of the flight plan 202 to be the flare regime 220 based on measurement(s) from the sensor(s) 350 (e.g., an altitude measurement from an altimeter), a command from the vehicle module 340 (FIG. 3), etc. For example, the vehicle module 340 may determine that the regime of the flight plan 202 is the flare regime 220 based on pilot input or unmanned pilot input.

At block 704, the vehicle controller 102, 300, 400, 500 determines whether the regime is the flare regime. For example, the fourth vehicle controller 500 may not control the aircraft 100 in response to determining that the regime of the flight plan 202 is not the flare regime 220. In such examples, a different aircraft control system (e.g., a non-observer model based aircraft control system) of the aircraft 100 may control the aircraft during other regimes of the flight plan 202.

If, at block 704, the vehicle controller 102, 300, 400, 500 determines that the regime is not the flare regime, control proceeds to block 706 to execute non-observer based aircraft control. For example, the aircraft 100 may be controlled by a non-observer model based aircraft control system. In some examples, the aircraft 100 may be controlled by portion(s) of the second vehicle controller 300 (FIG. 3). For example, the aircraft 100 may be controlled by at least one of the command input module 310, the baseline control module 330, the vehicle module 340, the sensor(s) 350, the network 360, the collection module 370, or the datastore 380. In such examples, the observer module 320 may be disabled when the regime of the flight plan 202 is not the flare regime 220. In response to executing non-observer based aircraft control at block 706, control proceeds to block 722 to determine whether to continue monitoring the aircraft.

If, at block 704, the vehicle controller 102, 300, 400, 500 determines that the regime is the flare regime, control proceeds to block 708 to enable observer-based landing control. For example, the fourth vehicle controller 500 may enable at least one of the observer module 510 or the baseline control module 530 to be enabled to land (e.g., automatically land) the aircraft 100 during the flare regime 220 of the flight plan 202. In some examples, the fourth vehicle controller 500 may enable at least one of the observer module 510 or the baseline control module 530 in response to determining the regime to be the flare regime 220, a pilot input or unmanned pilot input, measurement(s) from one(s) of the sensors 138, 140, 142, 144 of FIG. 1, etc., and/or a combination thereof.

At block 710, the vehicle controller 102, 300, 400, 500 determines an altitude command. For example, the fourth vehicle controller 500 may determine the altitude command $h_{cmd}$. In some examples, the fourth vehicle controller 500 determines the altitude command $h_{cmd}$ based on a command, instruction, etc., from the command input module 310 (FIG. 3), measurement(s) from the sensor(s) 350 (FIG. 3), a command, instruction, etc., from the datastore 380 (FIG. 3), etc., and/or a combination thereof. For example, the observer module 510 may obtain the altitude command $h_{cmd}$ from the command input module 310, the datastore 380, and/or other portion(s) of the first vehicle controller 102, the second vehicle controller 300, etc.

At block 712, the vehicle controller 102, 300, 400, 500 determines an estimate state of an aircraft parameter, such as an altitude of the aircraft 100, based on a transfer function of an observer model. For example, the observer module 510 (FIG. 5) may invoke and/or otherwise cause an execution of the transfer function 514 to determine $\hat{h}$, $\hat{q}$, $\hat{\theta}$, and $\hat{h}$, which are estimates of the aircraft altitude rate, the pitch rate, the pitch angle, and the altitude, respectively. In such examples, the observer module 510 may execute the transfer function based on the altitude command $h_{cmd}$.

At block 714, the vehicle controller 102, 300, 400, 500 determines an altitude control input based on the estimate states. For example, the observer module 510 may determine the altitude control input $\delta_e$ based on the LQR constant gain $K_{lqr}$ 516 and the estimates of the aircraft altitude rate, the pitch rate, the pitch angle, and the altitude.

At block 716, the vehicle controller 102, 300, 400, 500 determines an altitude command output based on the altitude control input and an aircraft plant. For example, the baseline control module 530 may determine the altitude command output h by invoking the longitudinal dynamics represented by the aircraft plant 532 based on the altitude control input $\delta_e$ determined by the observer module 510.

At block 718, the vehicle controller 102, 300, 400, 500 control elevator(s) of the aircraft 100 based on the altitude command output. For example, the baseline control module 530 may output the altitude command output h to facilitate control of one(s) of the elevators 130, 132 (FIG. 1). In some examples, the baseline control module 530 provides the altitude command output h to the first actuator 148 to control the first elevator 130 to move from a first position to a second position. In some examples, the baseline control module 530 provides the altitude command output h to the vehicle module 340 (FIG. 3), which may provide the altitude command output h to the first actuator 148 to control the first elevator 130 to move from a first position to a second position.

At block 720, the vehicle controller 102, 300, 400, 500 determines measured state(s) of the aircraft parameter(s) in response to the control of the elevator(s). For example, in response to the elevators 130, 132, and/or, more generally, the aircraft 100, operating based on the altitude command output h, the baseline control module 530 may determine $\hat{h}$, q, θ, and h, which are measured states of the aircraft altitude rate $\dot{h}$, the pitch rate q, the pitch angle θ, and the altitude h, respectively. In some examples, the baseline control module 530 may determine such measured states based on measurement(s) from one(s) of the sensors 138, 140, 142, 144 of FIG. 1. For example, the observer module 510 may determine updated estimates of $\hat{\dot{h}}$, $\hat{q}$, $\hat{\theta}$, and $\hat{h}$ based on a difference between the altitude command $h_{cmd}$ and the altitude command output h.

At block 722, the vehicle controller 102, 300, 400, 500 determines whether to continue monitoring the aircraft. For example, the observer module 510, and/or, more generally, the fourth vehicle controller 500, may determine to continue controlling the landing of the aircraft 100 because the aircraft 100 is in the flare regime 220 of the flight plan 202. In some examples, the observer module 510, and/or, more generally, the fourth vehicle controller 500 may determine to not continue controlling the landing of the aircraft 100 because the aircraft 100 landed at the touchdown location 214 (FIG. 2).

If, at block 722, the vehicle controller 102, 300, 400, 500 determines to continue monitoring the aircraft, control returns to block 702 to determine the regime of the flight plan of the aircraft 100. If, at block 722, the vehicle controller 102, 300, 400, 500 determines not to continue monitoring the aircraft, the example machine readable instructions 700 of FIG. 7 conclude.

Figure 8:
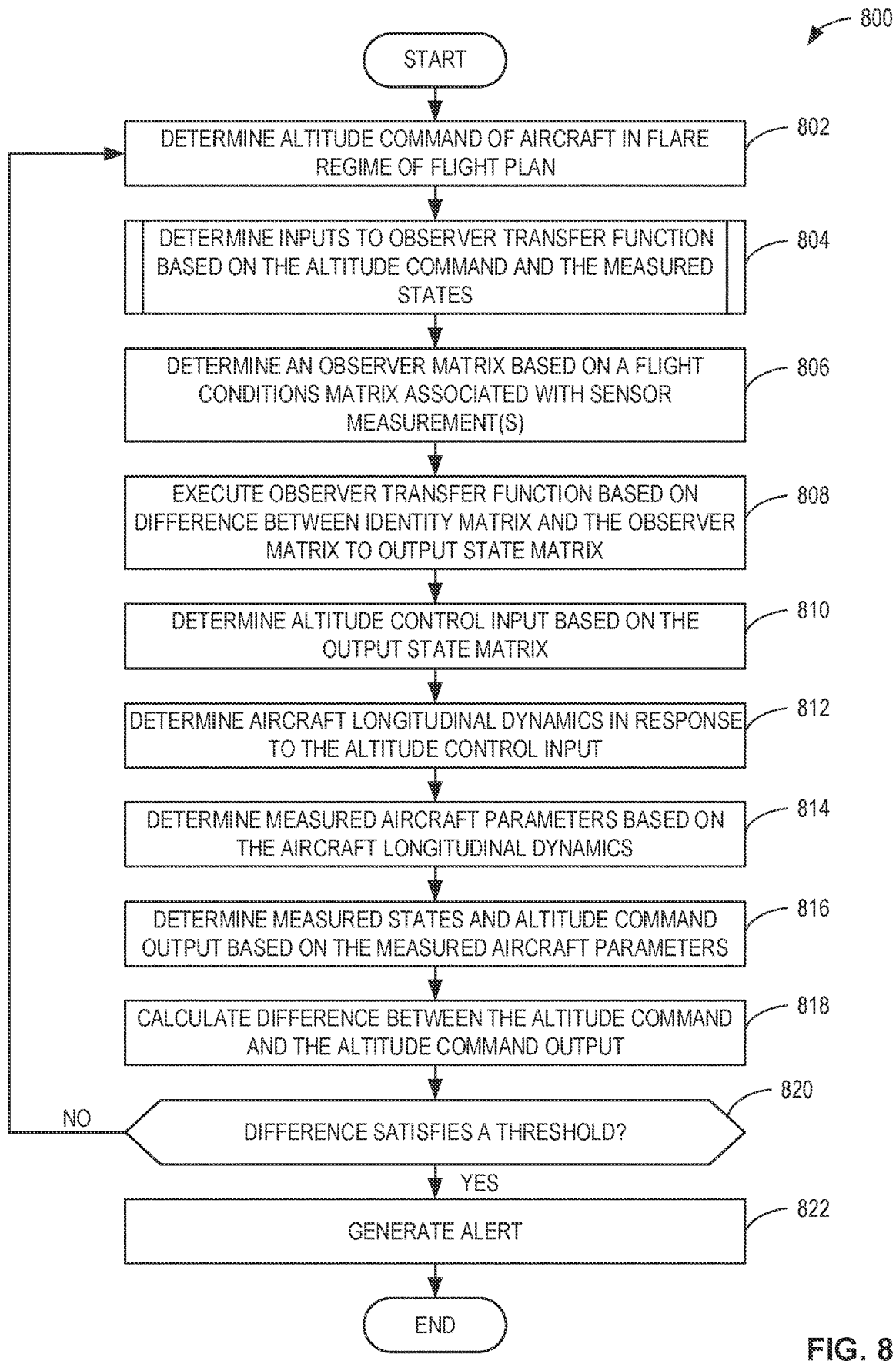
FIG. 8 is yet another flowchart representative of example machine readable instructions that may be executed to implement the example vehicle controller of FIGS. 1, 3, 4, and/or 5 to facilitate observer-based landing control of the example aircraft of FIGS. 1 and/or 2.

FIG. 8 is a flowchart representative of example machine readable instructions 800 that may be executed to implement the first vehicle controller 102 of FIG. 1, the second vehicle controller 300 of FIG. 3, the third vehicle controller 400 of FIG. 4, and/or the fourth vehicle controller 500 of FIG. 5 to perform observer-based landing control of the aircraft 100 of FIGS. 1 and/or 2. The example machine readable instructions 800 begin at block 802, at which the vehicle controller 102, 300, 400, 500 determines an altitude command of an aircraft in a flare regime of a flight plan. For example, the fourth vehicle controller 500 may determine the altitude command $h_{cmd}$. In some examples, the fourth vehicle controller 500 determines the altitude command $h_{cmd}$ based on a command, instruction, etc., from the command input module 310 (FIG. 3), measurement(s) from the sensor(s) 350 (FIG. 3), a command, instruction, etc., from the datastore 380 (FIG. 3), etc., and/or a combination thereof. For example, the observer module 510 (FIG. 5) may obtain the altitude command $h_{cmd}$ from the command input module 310, the datastore 380, and/or other portion(s) of the first vehicle controller 102, the second vehicle controller 300, etc.

At block 804, the vehicle controller 102, 300, 400, 500 determines inputs to an observer transfer function based on the altitude command and the measured states. For example, the observer module 510 may determine one or more inputs to the transfer function 514 (FIG. 5) including the gain command value 512. An example process that may be executed to implement block 804 is described below in connection with FIG. 9.

At block 806, the vehicle controller 102, 300, 400, 500 determines an observer matrix based on a flight conditions matrix associated with sensor measurement(s). For example, the observer module 510 may determine $A_{obs}$ based on a matrix including values for one or more flight conditions associated with measurement(s) from one(s) of the sensors 138, 140, 142, 144 of FIG. 1. In some examples, the observer module 510 may map a first flight condition of an airspeed of the aircraft 100 based on a measurement from the first sensor 138 or a different sensor, a second flight condition of an altitude of the aircraft 100 based on a measurement from the first sensor 138 or a different sensor, a third flight condition of a weight of the aircraft 100 based on a measurement from a sensor that may be monitoring fuel capacity of the aircraft 100, etc., to one or more values in a look-up table. For example, the observer module 510 may map the first flight condition, the second flight condition, the third flight condition, etc., to the one or more values to populate and/or otherwise generate $A_{obs}$ of the transfer function 514.

At block 808, the vehicle controller 102, 300, 400, 500 executes the observer transfer function based on a difference between an identity matrix and the observer matrix to output a state matrix. For example, the observer module 510 may execute the transfer function 514 based on a difference between the term $sI_{n \times n}$, which is based on the identity matrix $I_{n \times n}$, and $A_{obs}$, to determine the output state matrix including the terms $\hat{e}_{hr}$, $\hat{\dot{h}}$, $\hat{q}$, $\hat{\theta}$, and $\hat{h}$, which represent estimates of parameters of the aircraft 100.

At block 810, the vehicle controller 102, 300, 400, 500 determine an altitude control input based on the output state matrix. For example, the observer module 510 may determine the altitude control input $\delta_e$ based on the terms $\hat{e}_{hr}$, $\hat{\dot{h}}$, $\hat{q}$, $\hat{\theta}$, and $\hat{h}$ applied respectively to the LQR constant gain $K_{lqr}$ 516.

At block 812, the vehicle controller 102, 300, 400, 500 determines aircraft longitudinal dynamics in response to the altitude control input. For example, the baseline control module 530 may invoke the aircraft plant 532 to determine aircraft longitudinal dynamics of the aircraft 100, which may include a first velocity of the aircraft 100 along a body axis of the aircraft 100, a second velocity of the aircraft 100 perpendicular to the body axis of the aircraft 100, an angle (e.g., a body angle) between the body axis and the horizontal axis of the aircraft 100, an angular velocity of the aircraft 100, etc., and/or a combination thereof.

At block 814, the vehicle controller 102, 300, 400, 500 determines measured aircraft parameters based on the aircraft longitudinal dynamics. For example, the baseline control module 530 may determine measured values of aircraft parameters including an altitude, a pitch rate, a pitch angle, etc., of the aircraft 100 based on measurement(s) from one(s) of the sensors 138, 140, 142, 144. In some examples, the baseline control module 530 may determine the measured values of the aircraft parameters in response to a change in the aircraft longitudinal dynamics of the aircraft 100 based on the aircraft 100 being controlled based on the altitude control input $\delta_e$.

At block 816, the vehicle controller 102, 300, 400, 500 determines measured states and an altitude command output based on the measured aircraft parameters. For example, the baseline control module 530 may determine the measured states $\dot{h}$, q, θ, and h of FIG. 5 in response to the aircraft 100 being controlled based on the altitude control input $\delta_e$. In some examples, the baseline control module 530 may determine and/or otherwise output the altitude command output h to control one or more flight control surfaces of the aircraft 100, such as one(s) of the elevators 130, 132 of FIG. 1.

At block 818, the vehicle controller 102, 300, 400, 500 calculates a difference between the altitude command and the altitude command output. For example, the subtraction logic 524 (FIG. 5) may determine the difference between the altitude command $h_{cmd}$ and the altitude command output h.

At block 820, the vehicle controller 102, 300, 400, 500 determines whether the difference satisfies a threshold. For example, the subtraction logic 524 may determine that the difference between a first command (e.g., the altitude command $h_{cmd}$) to control the first elevator 130 to have an elevator angle of 30 degrees and a second command (e.g., the altitude command output h) to control the first elevator 130 to have an elevator angle of 27 degrees is 3 degrees, which may be greater than a threshold of 2 degrees and thereby satisfies the threshold.

If, at block 820, the subtraction logic 524 determines that the difference does not satisfy the threshold, control returns to block 802 to determine another altitude command of the aircraft in the flare regime of the flight plan. If, at block 820, the subtraction logic 524 determines that the difference satisfies the threshold, then, at block 822, the vehicle controller 102, 300, 400, 500 generates an alert. For example, the subtraction logic 524 or a different module or logic of the fourth vehicle controller 500 may generate an alert, an indication, etc., to indicate that the difference satisfies the threshold. In some examples, the subtraction logic 524 may generate the alert by transmitting data to a user interface of the aircraft 100, which may display the alert, the data, etc., to a pilot of the aircraft 100. For example, the pilot may take corrective action or adjust a configuration of the aircraft 100 based on the alert. In response to generating the alert at block 822, the machine readable instructions 800 of FIG. 8 conclude.

Figure 9:
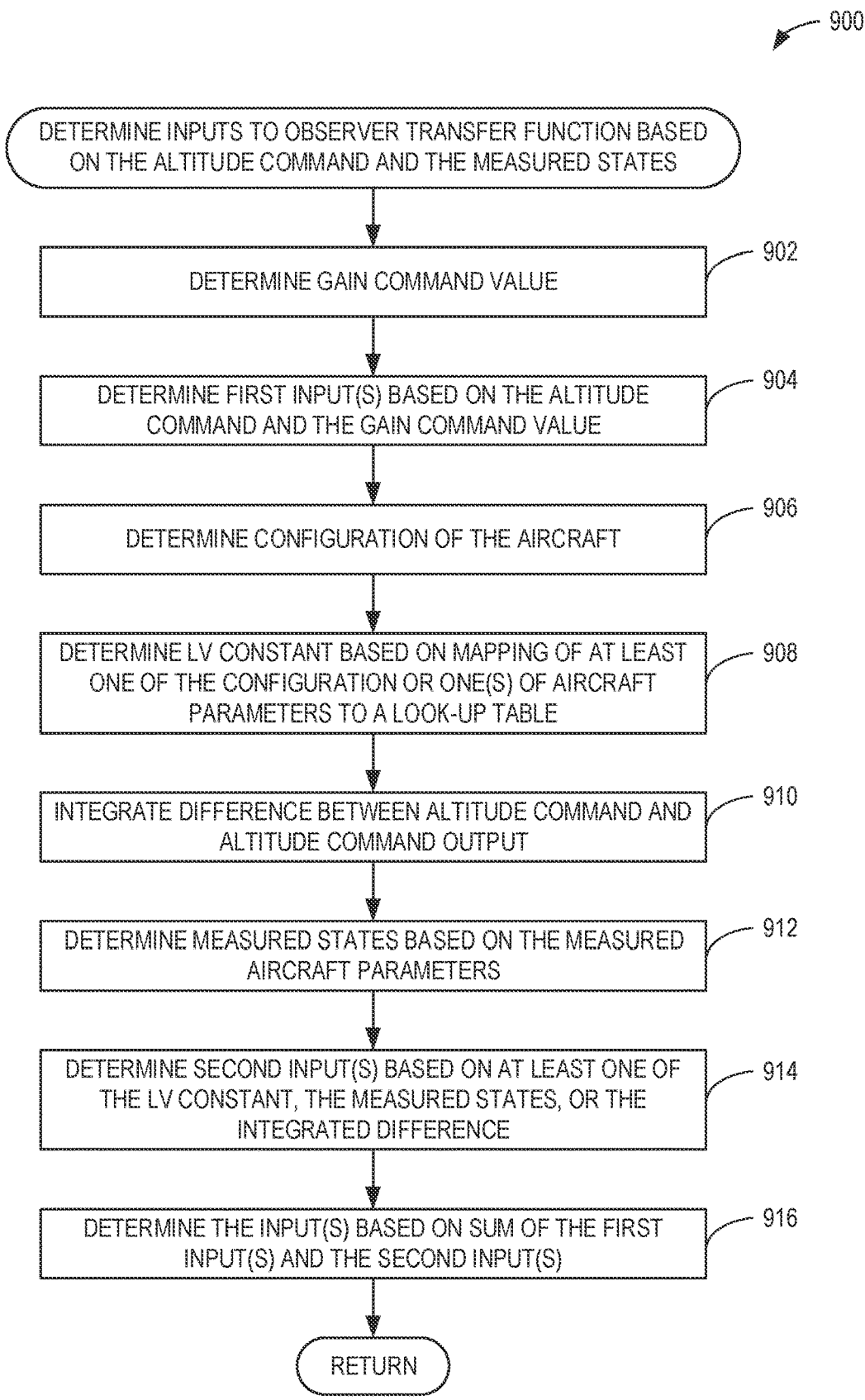
FIG. 9 is a flowchart representative of example machine readable instructions that may be executed to implement the example vehicle controller of FIGS. 1, 3, 4, and/or 5 to determine example input(s) to an example observer transfer function based on an example altitude command and example measured states.

FIG. 9 is a flowchart representative of example machine readable instructions 900 that may be executed to implement the first vehicle controller 102 of FIG. 1, the second vehicle controller 300 of FIG. 3, the third vehicle controller 400 of FIG. 4, and/or the fourth vehicle controller 500 of FIG. 5 to determine inputs to an observer transfer function based an altitude command and measured states. For example, the machine readable instructions 900 of FIG. 9 may be executed to implement block 804 of the machine readable instructions 800 of FIG. 8. The example machine readable instructions 900 begin at block 902, at which the vehicle controller 102, 300, 400, 500 determines a gain command value. For example, the observer module 510 (FIG. 5) may determine the gain command value 512 (FIG. 5) based on one or more parameters of the aircraft 100.

At block 904, the vehicle controller 102, 300, 400, 500 determines first input(s) based on the altitude command and the gain command value. For example, the observer module 510 may determine one or more first inputs to the adder logic 520 (FIG. 5) based on applying the gain command value 512 to the altitude command $h_{cmd}$.

At block 906, the vehicle controller 102, 300, 400, 500 determines a configuration of the aircraft. For example, the observer module 510 may query the collection module 370 (FIG. 3), the datastore 380 (FIG. 3), etc., to determine a configuration of the aircraft 100. In some examples, the configuration may include physical dimensions, specifications, etc., of the aircraft 100 such as a height, width, length, and/or weight of the aircraft 100.

At block 908, the vehicle controller 102, 300, 400, 500 determines an $L_v$ constant based on a mapping of at least one of the configuration or one(s) of aircraft parameters to a look-up table. For example, the observer module 510 may determine the observer error feedback gain $L_v$ 518 based on a mapping of at least one of the configuration or one(s) of aircraft parameters (e.g., an airspeed, an altitude, etc.) of the aircraft 100 to a look-up table to identify the observer error feedback gain $L_v$ 518.

At block 910, the vehicle controller 102, 300, 400, 500 integrates a difference between the altitude command and an altitude command output. For example, the integrator transfer function 522 may integrate the difference between the altitude command $h_{cmd}$ and the altitude command output h to determine the output observation error $e_{hI}$.

At block 912, the vehicle controller 102, 300, 400, 500 determines measured states based on the measured aircraft parameters. For example, the observer module 510 may determine the measured states ḣ, q, θ, and h of FIG. 5. In some examples, the observer module 510 determines the measured states by transposing the measured states obtained from the baseline control module 530.

At block 914, the vehicle controller 102, 300, 400, 500 determines second input(s) based on at least one of the $L_v$ constant, the measured states, or the integrated difference. For example, the observer module 510 may add the output observation error $e_{hI}$ to a matrix that includes the measured states. The observer module 510 may transpose the matrix that includes the output observation error $e_{hI}$ and the measured states to yield the transposed matrix $(e_{hI}\ \dot{h}\ q\ \theta\ h)^T$. The observer module 510 may apply the observer error feedback gain $L_v$ 518 to the transposed matrix to yield a scaled or adjusted transposed matrix to represent the second inputs to the adder logic 520 FIG. 5).

At block 916, the vehicle controller 102, 300, 400, 500 determines the input(s) based on a sum of the first input(s) and the second input(s). For example, the adder logic 520 may determine the input(s) to the transfer function 514 based on a sum of the first inputs and the second inputs. In response to determining the input(s) based on the sum of the first input(s) and the second input(s) at block 916, the machine readable instructions 900 of FIG. 9 return to block 806 of the machine readable instructions 800 of FIG. 8 to determine an observer matrix based on a flight conditions matrix associated with sensor measurement(s). Alternatively, in response to determining the input(s) based on the sum of the first input(s) and the second input(s) at block 916, the machine readable instructions 900 of FIG. 9 may conclude.

Figure 10:
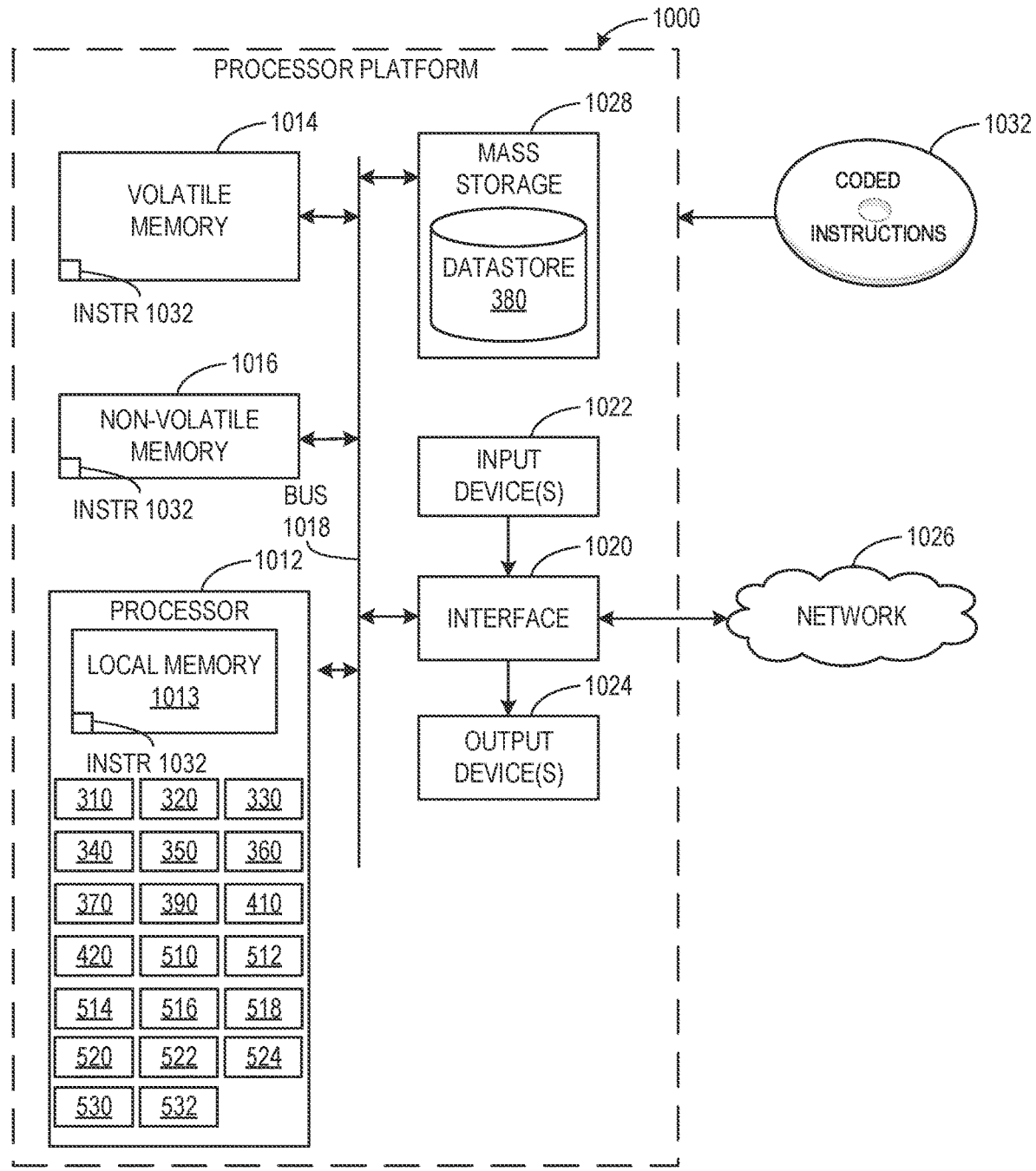
FIG. 10 is a block diagram of an example processing platform structured to execute the example machine-readable instructions of FIGS. 6-9 to implement the example vehicle controller of FIGS. 1, 3, 4, and/or 5.

FIG. 10 is a block diagram of an example processor platform 1000 structured to execute the instructions of FIGS. 6-9 to implement the first example vehicle controller 102, the second example vehicle controller 300, the third example vehicle controller 400, and/or the fourth example vehicle controller 500 of FIGS. 1, 2, 3, 4, and/or 5. The processor platform 1000 can be, for example, an aircraft computer, an industrial computer, a line replaceable unit, a remote electronic unit, a server, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example command input module 310, the example observer module 320, the example baseline control module 330, the example vehicle module 340, the example sensor(s) 350, the example network 360, the example collection module 370, the example error module 390, the example observer module 410 of FIG. 4, the example baseline control module 420 of FIG. 4, the example observer module 510 of FIG. 5, the example gain command value 512, the example transfer function 514, the example LQR constant gain 516, the example error observer feedback gain 518, the example adder logic 520 of FIG. 5, the example integrator transfer function 522, the example subtraction logic 524, the example baseline control module 530 of FIG. 5, and the example aircraft plant 532 of FIGS. 3, 4, and/or 5.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In this example, the one or more mass storage devices 1028 implement the example datastore 380 of FIG. 3.

The machine executable instructions 1032 of FIGS. 6-9 may be stored in the mass storage device 1028, in the volatile memory 1014, in the non-volatile memory 1016, and/or on a removable non-transitory computer readable storage medium such as a CD or DVD.

Figure 11:
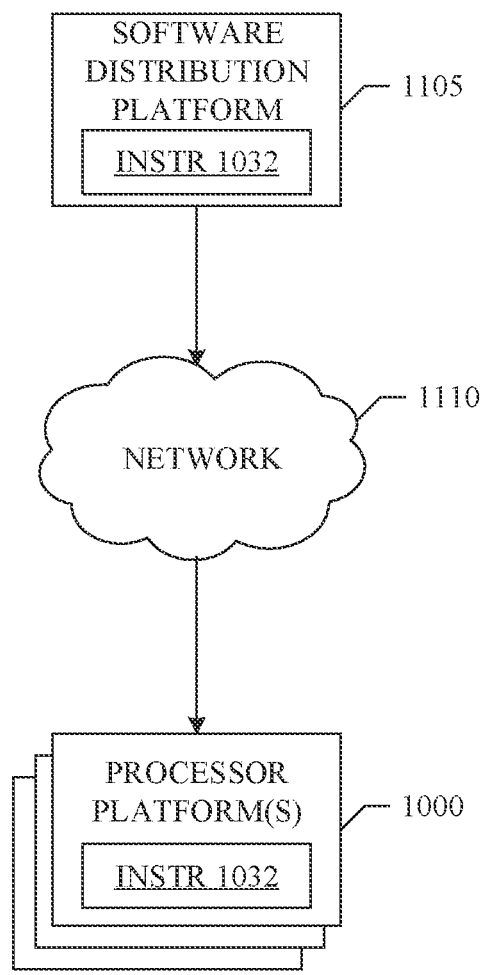
FIG. 11 is a block diagram of an example software distribution platform to distribute software (e.g., software corresponding to the example computer readable instructions of FIGS. 6-9) to example devices such as original equipment manufacturers (OEMs) (e.g., for inclusion in products to be distributed to, for example, aircraft manufacturers and/or to direct buy aircraft customers).

A block diagram illustrating an example software distribution platform 1105 to distribute software such as the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example computer readable instructions 1032 of FIG. 10. The third parties may be consumers (e.g., airline operators), users (e.g., pilots, technicians, etc.), retailers (e.g., aircraft suppliers, aircraft vendors, etc.), OEMs (e.g., aircraft OEMs), etc., who purchase and/or license the software for use and/or re-sale and/or sub-licensing. In the illustrated example, the software distribution platform 1105 includes one or more servers and one or more storage devices. The storage devices store the computer readable instructions 1032, which may correspond to the example computer readable instructions 600, 700, 800, 900 of FIGS. 6-9, as described above. The one or more servers of the example software distribution platform 1105 are in communication with a network 1110, which may correspond to any one or more of the Internet and/or any of the example networks 360, 1026 described above. In some examples, the one or more servers are responsive to requests to transmit the software to a requesting party as part of a commercial transaction. Payment for the delivery, sale and/or license of the software may be handled by the one or more servers of the software distribution platform 1105 and/or via a third party payment entity. The servers enable purchasers and/or licensors to download the computer readable instructions 1032 from the software distribution platform 1105. For example, the software, which may correspond to the example computer readable instructions 600, 700, 800, 900 of FIGS. 6-9, may be downloaded to the example processor platform 1000, which is to execute the computer readable instructions 1032 to implement one(s) of the example vehicle controllers 102, 300, 400, 500 of FIGS. 1, 3, 4, and/or 5. In some examples, one or more servers of the software distribution platform 1105 periodically offer, transmit, and/or force updates to the software (e.g., the example computer readable instructions 1032 of FIG. 10) to ensure improvements, patches, updates, etc. are distributed and applied to the software at the end user devices (e.g., aircraft control computers, remote electronic units, etc.).

From the foregoing, it will be appreciated that the above disclosed methods, apparatus, and articles of manufacture provide observer-based landing control of a vehicle, such as an aircraft. The above disclosed vehicle control apparatus can determine a command to control the vehicle during a flare regime of a flight plan based on determining and/or estimating one or more states of a vehicle parameter during the flare regime. The above disclosed vehicle controllers can perform state feedback margin recovery while increasing robustness at high frequencies. In addition, the above disclosed vehicle controllers may implement adaptive control to control the vehicle when one or more vehicle parameter states are unknown.

Example methods, apparatus, systems, and articles of manufacture for observer-based landing control of a vehicle are disclosed herein. Further examples and combinations thereof include the following:

Example 1 includes an apparatus comprising at least one memory, and at least one processor to execute instructions to at least in response to determining an aircraft is in a flare regime of a flight plan, determine an estimate state of an aircraft parameter based on an execution of a transfer function of an observer model, the execution of the transfer function based on an altitude command corresponding to the flare regime, determine a gain value based on a measured state of the aircraft parameter, determine an altitude control input based on the estimate state and the gain value, determine an altitude command output based on the altitude control input and longitudinal dynamics of the aircraft, the longitudinal dynamics generated in response to the aircraft executing the altitude command output, and control an elevator of the aircraft based on the altitude command output.

Example 2 includes the apparatus of example 1, wherein the altitude command is based on a trajectory from a first position of the aircraft in the flare regime of the flight plan to a second position on a ground surface as a function of time.

Example 3 includes the apparatus of example 1 or 2, wherein the aircraft parameter includes at least one of an altitude, a configuration, or an airspeed of the aircraft, and the at least one processor is to map the at least one of the altitude, the configuration, or the airspeed to a look-up table to determine the gain value.

Example 4 includes the apparatus of any of examples 1-3, wherein the estimate state is based on one or more measured states including the measured state, the one or more measured states based on at least one of an altitude parameter, an angle of attack parameter, or a sideslip parameter, the at least one of the altitude parameter, the angle of attack parameter, or the sideslip parameter based on a measurement from a sensor, the sensor being an altimeter, an acceleration sensor, a gyro sensor, or an angular rate sensor.

Example 5 includes the apparatus of any of examples 1-4, wherein the at least one processor is to determine an observer matrix based on a flight conditions matrix, the flight conditions matrix including values associated with a plurality of flight conditions, and execute the transfer function based on a difference between an identity matrix and the observer matrix to output a state matrix, the state matrix including the estimate state of the aircraft parameter.

Example 6 includes the apparatus of any of examples 1-5, wherein the at least one processor is to determine a difference between the altitude command and the altitude command output, and in response to the difference satisfying a threshold, adjust the estimate state of the aircraft parameter based on the difference.

Example 7 includes the apparatus of any of examples 1-6, wherein the gain value is a first gain value, and the at least one processor is to determine a second gain value, determine one or more first inputs based on a bounded altitude command and the second gain value, determine a configuration of the aircraft, determine an observer error feedback gain based on a mapping of at least one of the configuration or the aircraft parameter to a look-up table, integrate a difference between the bounded altitude command and the altitude command output, determine one or more second inputs based on at least one of the observer error feedback gain, the aircraft parameter, or the integrated difference, and determine one or more third inputs to the observer model based on a sum of the one or more first inputs and the one or more second inputs.

Example 8 includes a non-transitory computer readable storage medium comprising instructions that, when executed, cause at least one processor to at least in response to determining an aircraft is in a flare regime of a flight plan, determine an estimate state of an aircraft parameter based on an execution of a transfer function of an observer model, the execution of the transfer function based on an altitude command corresponding to the flare regime, determine a gain value based on a measured state of the aircraft parameter, determine an altitude control input based on the estimate state and the gain value, determine an altitude command output based on the altitude control input and longitudinal dynamics of the aircraft, the longitudinal dynamics generated in response to the aircraft executing the altitude command output, and control an elevator of the aircraft based on the altitude command output.

Example 9 includes the non-transitory computer readable storage medium of example 8, wherein the altitude command is based on a trajectory from a first position of the aircraft in the flare regime of the flight plan to a second position on a ground surface as a function of time.

Example 10 includes the non-transitory computer readable storage medium of example 8 or 9, wherein the aircraft parameter includes at least one of an altitude, a configuration, or an airspeed of the aircraft, and the instructions, when executed, cause the at least one processor to map the at least one of the altitude, the configuration, or the airspeed to a look-up table to determine the gain value.

Example 11 includes the non-transitory computer readable storage medium of any of examples 8-10, wherein the estimate state is based on one or more measured states including the measured state, the one or more measured states based on at least one of an altitude parameter, an angle of attack parameter, or a sideslip parameter, the at least one of the altitude parameter, the angle of attack parameter, or the sideslip parameter based on a measurement from a sensor, the sensor being an altimeter, an acceleration sensor, a gyro sensor, or an angular rate sensor.

Example 12 includes the non-transitory computer readable storage medium of any of examples 8-11, wherein the instructions, when executed, cause the at least one processor to determine an observer matrix based on a flight conditions matrix, the flight conditions matrix including values associated with a plurality of flight conditions, and execute the transfer function based on a difference between an identity matrix and the observer matrix to output a state matrix, the state matrix including the estimate state of the aircraft parameter.

Example 13 includes the non-transitory computer readable storage medium of any of examples 8-12, wherein the instructions, when executed, cause the at least one processor to determine a difference between the altitude command and the altitude command output, and in response to the difference satisfying a threshold, adjust the estimate state of the aircraft parameter based on the difference.

Example 14 includes the non-transitory computer readable storage medium of any of examples 8-13, wherein the gain value is a first gain value, and the instructions, when executed, cause the at least one processor to determine a second gain value, determine one or more first inputs based on a bounded altitude command and the second gain value, determine a configuration of the aircraft, determine an observer error feedback gain based on a mapping of at least one of the configuration or the aircraft parameter to a look-up table, integrate a difference between the bounded altitude command and the altitude command output, determine one or more second inputs based on at least one of the observer error feedback gain, the aircraft parameter, or the integrated difference, and determine one or more third inputs to the observer model based on a sum of the one or more first inputs and the one or more second inputs.

Example 15 includes a method comprising in response to determining an aircraft is in a flare regime of a flight plan, determining an estimate state of an aircraft parameter based on an execution of a transfer function of an observer model, the execution of the transfer function based on an altitude command, determining a gain value based on an aircraft parameter, determining an altitude control input based on the estimate state and the gain value, determining an altitude command output based on the altitude control input and longitudinal dynamics of the aircraft, the longitudinal dynamics generated in response to the aircraft executing the altitude command output, and controlling an elevator of the aircraft based on the altitude command output.

Example 16 includes the method of example 15, wherein the aircraft parameter includes at least one of an altitude, a configuration, or an airspeed of the aircraft, and further including mapping the at least one of the altitude, the configuration, or the airspeed to a look-up table to determine the gain value.

Example 17 includes the method of example 15 or 16, wherein the estimate state is based on one or more measured states including the measured state, the one or more measured states based on at least one of an altitude parameter, an angle of attack parameter, or a sideslip parameter, the at least one of the altitude parameter, the angle of attack parameter, or the sideslip parameter based on a measurement from a sensor, the sensor being an altimeter, an acceleration sensor, a gyro sensor, or an angular rate sensor.

Example 18 includes the method of any of examples 15-17, further including determining an observer matrix based on a flight conditions matrix, the flight conditions matrix including values associated with a plurality of flight conditions, and executing the transfer function based on a difference between an identity matrix and the observer matrix to output a state matrix, the state matrix including the estimate state of the aircraft parameter.

Example 19 includes the method of any of examples 15-18, further including determining a difference between the altitude command and the altitude command output, and in response to the difference satisfying a threshold, adjusting the estimate state of the aircraft parameter based on the difference.

Example 20 includes the method of any of examples 15-19, wherein the gain value is a first gain value, and further including determining a second gain value, determining one or more first inputs based on a bounded altitude command and the second gain value, determining a configuration of the aircraft, determining an observer error feedback gain based on a mapping of at least one of the configuration or the aircraft parameter to a look-up table, integrating a difference between the bounded altitude command and the altitude command output, determining one or more second inputs based on at least one of the observer error feedback gain, the aircraft parameter, or the integrated difference, and determining one or more third inputs to the observer model based on a sum of the one or more first inputs and the one or more second inputs.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   machine-readable instructions; and
   at least one processor circuit to execute the machine-readable instructions to at least:
      in response to determining an aircraft is in a flare regime of a flight plan, determine a first estimate state of an aircraft parameter and a second estimate state based on an execution of a transfer function of an observer model, the execution of the transfer function based on an altitude command corresponding to the flare regime, the first estimate state corresponding to an altitude estimate and the second estimate state corresponding to an observation error estimate;
      determine a gain value based on a measured state of the aircraft parameter;
      determine an altitude control input based on application of the gain value to the first estimate state and application of the gain value to the second estimate state;
      determine an altitude command output based on the altitude control input and longitudinal dynamics of the aircraft, the longitudinal dynamics generated in response to the aircraft executing the altitude control input; and
      control an elevator of the aircraft based on the altitude command output.

2. The apparatus of claim 1, wherein the altitude command is based on a trajectory from a first position of the aircraft in the flare regime of the flight plan to a second position on a ground surface as a function of time.

3. The apparatus of claim 1, wherein the aircraft parameter includes an altitude, and one or more of the at least one processor circuit is to map the altitude to a look-up table to determine the gain value.

4. The apparatus of claim 1, wherein the first estimate state is based on one or more measured states including the measured state, at least one of the one or more measured states based on at least one of an altitude parameter, the altitude parameter based on a measurement from a sensor, the sensor being an altimeter.

5. The apparatus of claim 1, wherein one or more of the at least one processor circuit is to:
   determine an observer matrix based on a flight conditions matrix, the flight conditions matrix including values associated with a plurality of flight conditions; and
   execute the transfer function based on a difference between an identity matrix and the observer matrix to output a state matrix, the state matrix including the first estimate state of the aircraft parameter.

6. The apparatus of claim 1, wherein one or more of the at least one processor circuit is to:
   determine a difference between the altitude command and the altitude command output; and
   in response to the difference satisfying a threshold, adjust the first estimate state of the aircraft parameter based on the difference.

7. The apparatus of claim 1, wherein the gain value is a first gain value, and one or more of the at least one processor circuit is to:
   determine a second gain value;

determine one or more first inputs based on a bounded altitude command and the second gain value;
determine a configuration of the aircraft;
determine an observer error feedback gain based on a mapping of at least one of the configuration or the aircraft parameter to a look-up table;
integrate a difference between the bounded altitude command and the altitude command output;
determine one or more second inputs based on at least one of the observer error feedback gain, the aircraft parameter, or the integrated difference; and
determine one or more third inputs to the observer model based on a sum of the one or more first inputs and the one or more second inputs.

8. A non-transitory computer readable storage medium comprising machine-readable instructions to cause at least one processor circuit to at least:
in response to determining an aircraft is in a flare regime of a flight plan, determine a first estimate state of an aircraft parameter and a second estimate state based on an execution of a transfer function of an observer model, the execution of the transfer function based on an altitude command corresponding to the flare regime, the first estimate state corresponding to an altitude estimate and the second estimate state corresponding to an observation error estimate;
determine a gain value based on a measured state of the aircraft parameter;
determine an altitude control input based on application of the gain value to the first estimate state and application of the gain value to the second estimate state;
determine an altitude command output based on the altitude control input and longitudinal dynamics of the aircraft, the longitudinal dynamics generated in response to the aircraft executing the altitude control input; and
control an elevator of the aircraft based on the altitude command output.

9. The non-transitory computer readable storage medium of claim 8, wherein the altitude command is based on a trajectory from a first position of the aircraft in the flare regime of the flight plan to a second position on a ground surface as a function of time.

10. The non-transitory computer readable storage medium of claim 8, wherein the aircraft parameter includes an altitude and the machine-readable instructions are to cause one or more of the at least one processor circuit to map the altitude to a look-up table to determine the gain value.

11. The non-transitory computer readable storage medium of claim 8, wherein the first estimate state is based on one or more measured states including the measured state, at least one of the one or more measured states based on an altitude parameter, the altitude parameter based on a measurement from a sensor, the sensor being an altimeter.

12. The non-transitory computer readable storage medium of claim 8, wherein the machine-readable instructions are to cause one or more of the at least one processor circuit to:
determine an observer matrix based on a flight conditions matrix, the flight conditions matrix including values associated with a plurality of flight conditions; and
execute the transfer function based on a difference between an identity matrix and the observer matrix to output a state matrix, the state matrix including the first estimate state of the aircraft parameter.

13. The non-transitory computer readable storage medium of claim 8, wherein the machine-readable instructions are to cause one or more of the at least one processor circuit to:
determine a difference between the altitude command and the altitude command output; and
in response to the difference satisfying a threshold, adjust the first estimate state of the aircraft parameter based on the difference.

14. The non-transitory computer readable storage medium of claim 8, wherein the gain value is a first gain value, and the machine-readable instructions are to cause the at least one processor circuit to:
determine a second gain value;
determine one or more first inputs based on a bounded altitude command and the second gain value;
determine a configuration of the aircraft;
determine an observer error feedback gain based on a mapping of at least one of the configuration or the aircraft parameter to a look-up table;
integrate a difference between the bounded altitude command and the altitude command output;
determine one or more second inputs based on at least one of the observer error feedback gain, the aircraft parameter, or the integrated difference; and
determine one or more third inputs to the observer model based on a sum of the one or more first inputs and the one or more second inputs.

15. A method comprising:
in response to determining an aircraft is in a flare regime of a flight plan, determining a first estimate state of an aircraft parameter and a second estimate state based on an execution of a transfer function of an observer model, the execution of the transfer function based on an altitude command, the first estimate state corresponding to an altitude estimate and the second estimate state corresponding to an observation error estimate;
determining a gain value based on the aircraft parameter;
determining an altitude control input based on application of the gain value to the first estimate state and application of the gain value to the second estimate state;
determining an altitude command output based on the altitude control input and longitudinal dynamics of the aircraft, the longitudinal dynamics generated in response to the aircraft executing the altitude control input; and
controlling an elevator of the aircraft based on the altitude command output.

16. The method of claim 15, wherein the aircraft parameter includes an altitude, a configuration, or an airspeed of the aircraft, and further including mapping the altitude to a look-up table to determine the gain value.

17. The method of claim 15, wherein the first estimate state is based on one or more measured states including the measured state, at least one of the one or more measured states based on an altitude parameter, the altitude parameter based on a measurement from a sensor, the sensor being an altimeter.

18. The method of claim 15, further including:
determining an observer matrix based on a flight conditions matrix, the flight conditions matrix including values associated with a plurality of flight conditions; and
executing the transfer function based on a difference between an identity matrix and the observer matrix to output a state matrix, the state matrix including the first estimate state of the aircraft parameter.

19. The method of claim 15, further including:
determining a difference between the altitude command and the altitude command output; and in response to the difference satisfying a threshold, adjusting the first estimate state of the aircraft parameter based on the difference.

20. The method of claim 15, wherein the gain value is a first gain value, and further including:
  determining a second gain value;
  determining one or more first inputs based on a bounded altitude command and the second gain value;
  determining a configuration of the aircraft;
  determining an observer error feedback gain based on a mapping of at least one of the configuration or the aircraft parameter to a look-up table;
  integrating a difference between the bounded altitude command and the altitude command output;
  determining one or more second inputs based on at least one of the observer error feedback gain, the aircraft parameter, or the integrated difference; and
  determining one or more third inputs to the observer model based on a sum of the one or more first inputs and the one or more second inputs.

* * * * *

UNITED STATES PATENT AND TRADEMARK OFFICE
CERTIFICATE OF CORRECTION

| | | |
|---|---|---|
| PATENT NO. | : 12,165,527 B2 | Page 1 of 1 |
| APPLICATION NO. | : 17/526782 | |
| DATED | : December 10, 2024 | |
| INVENTOR(S) | : Lavretsky et al. | |

It is certified that error appears in the above-identified patent and that said Letters Patent is hereby corrected as shown below:

In the Claims

Column 44, Claim 4, Line 45, Delete "at least one of"

Column 46, Claim 16, Line 47, Delete ", a configuration, or an airspeed"

Signed and Sealed this
Eighteenth Day of February, 2025

Coke Morgan Stewart
*Acting Director of the United States Patent and Trademark Office*